United States Patent
Asano

(10) Patent No.: US 12,056,407 B2
(45) Date of Patent: Aug. 6, 2024

(54) INFORMATION PROCESSING APPARATUS, METHOD, SYSTEM, AND MEDIUM, WITH SETUP PAGE THAT SHOWS INFORMATION INDICATING FUNCTIONS

(71) Applicant: RICOH COMPANY, LTD., Tokyo (JP)

(72) Inventor: Kazuko Asano, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/864,743

(22) Filed: Jul. 14, 2022

(65) Prior Publication Data
US 2022/0374182 A1    Nov. 24, 2022

Related U.S. Application Data

(63) Continuation of application No. 16/353,547, filed on Mar. 14, 2019, now Pat. No. 11,422,760, which is a
(Continued)

(30) Foreign Application Priority Data

Sep. 15, 2006    (JP) ................................. 2006-251900
May 30, 2007    (JP) ................................. 2007-143646

(51) Int. Cl.
*G06F 3/12*    (2006.01)

(52) U.S. Cl.
CPC .......... *G06F 3/1253* (2013.01); *G06F 3/1204* (2013.01); *G06F 3/1229* (2013.01); *G06F 3/1232* (2013.01); *G06F 3/1285* (2013.01)

(58) Field of Classification Search
CPC .... G06F 3/1253; G06F 3/1204; G06F 3/1229; G06F 3/1232; G06F 3/1285
See application file for complete search history.

(56) References Cited

U.S. PATENT DOCUMENTS 6,145,031 A    11/2000    Mastie et al.
6,532,491 B1    3/2003    Lakis et al.
(Continued)

FOREIGN PATENT DOCUMENTS

JP    2002-259085    9/2002
JP    2003-44374 A    2/2003
(Continued)

OTHER PUBLICATIONS

Japanese Office Action issued Oct. 6, 2015 in corresponding Japanese Application No. 2014-176781.

*Primary Examiner* — Nicholas Pachol
(74) *Attorney, Agent, or Firm* — XSENSUS LLP

(57) ABSTRACT

A disclosed information processing apparatus is capable of acquiring, from a device connected to the information processing apparatus, configuration information concerning the device for a setup corresponding to the device according to the configuration information. The information processing apparatus includes a function file storage configured to hold a function file describing a function of the device; a device classifying unit configured to classify the device into a category according to the configuration information acquired from the device; an information acquiring unit configured to acquire, from the device, information concerning the function described in the function file corresponding to the category into which the device is classified by the device classifying unit; and a display unit configured to display a setup page used for the setup corresponding to the device, according to the information acquired by the information acquiring unit.

18 Claims, 21 Drawing Sheets

Related U.S. Application Data continuation of application No. 14/680,417, filed on Apr. 7, 2015, now Pat. No. 10,275,195, which is a continuation of application No. 11/898,177, filed on Sep. 10, 2007, now Pat. No. 9,025,193.

(56) References Cited

U.S. PATENT DOCUMENTS

| | | |
|---|---|---|
| 7,430,745 B2 | 9/2008 | Kato |
| 2001/0037390 A1 | 11/2001 | Kuroyanagi |
| 2001/0044822 A1 | 11/2001 | Nishio |
| 2002/0030840 A1 | 3/2002 | Itaki et al. |
| 2002/0054316 A1 | 5/2002 | Abe |
| 2002/0093682 A1 | 7/2002 | Nakajima |
| 2003/0005097 A1 | 1/2003 | Barnard |
| 2003/0090704 A1 | 5/2003 | Hansen |
| 2003/0169444 A1* | 9/2003 | Kemp .................. G06F 3/1204 358/1.15 |
| 2003/0200285 A1 | 10/2003 | Hansen |
| 2003/0233488 A1 | 12/2003 | Ozaki |
| 2004/0090648 A1 | 5/2004 | Green et al. |
| 2004/0213614 A1* | 10/2004 | Uchida ................. G06F 3/1285 400/62 |
| 2004/0250264 A1 | 12/2004 | Kato |
| 2004/0257604 A1 | 12/2004 | Morooka et al. |
| 2004/0258428 A1 | 12/2004 | Lee |
| 2005/0044200 A1* | 2/2005 | Aritomi .............. H04L 41/0856 709/224 |
| 2005/0044416 A1 | 2/2005 | Kobayashi |
| 2005/0050013 A1* | 3/2005 | Ferlitsch ............... G06F 3/1204 |
| 2005/0055641 A1 | 3/2005 | Machida |
| 2005/0094163 A1 | 5/2005 | Kim |
| 2005/0141025 A1 | 6/2005 | Hanada |
| 2005/0225795 A1 | 10/2005 | Nuggehalli |
| 2005/0243362 A1 | 11/2005 | Sakuda |
| 2006/0114509 A1 | 6/2006 | Itaki et al. |
| 2006/0132835 A1 | 6/2006 | Nagaraja |
| 2006/0132845 A1 | 6/2006 | Itaki et al. |
| 2006/0146368 A1 | 7/2006 | Uchida |
| 2006/0158674 A1 | 7/2006 | Mizoguchi |
| 2007/0011362 A1 | 1/2007 | Umekage et al. |
| 2007/0046989 A1 | 3/2007 | Shima |
| 2007/0073865 A1 | 3/2007 | Motoyama |
| 2007/0083679 A1 | 4/2007 | Kikuchi |
| 2007/0179899 A1 | 8/2007 | Hase et al. |
| 2007/0216938 A1 | 9/2007 | Tomita |
| 2007/0216945 A1 | 9/2007 | Nakaju |
| 2007/0253024 A1 | 11/2007 | Chatcavage |

FOREIGN PATENT DOCUMENTS

| | | |
|---|---|---|
| JP | 2004-310644 A | 11/2004 |
| JP | 2005-258721 | 9/2005 |
| JP | 2002-175258 | 6/2007 |
| JP | 2014-176781 | 10/2015 |

\* cited by examiner

FIG.17

```
                                    ┌─1702        ┌─1700
<machine name="Printer made by ooo">
        <option name="Function Unit 1">  ┐
                <id name="1"/>            ├─1710
        </option>         ↳─1712         ┘

<option name="Color">                      ┐
                <suboption name="Color">    ┐      │
                        <id name="4"/>      ├─1730 │
                </suboption>   ↳─1732      ┘       ├─1720
                <suboption name="Mnochrome">┐      │
                        <id name="1"/>      ├─1740 │
                </suboption>   ↳─1742      ┘       │
        </option>                                  ┘

<option name="Tray"/> ─┐─1750
</machine>
```

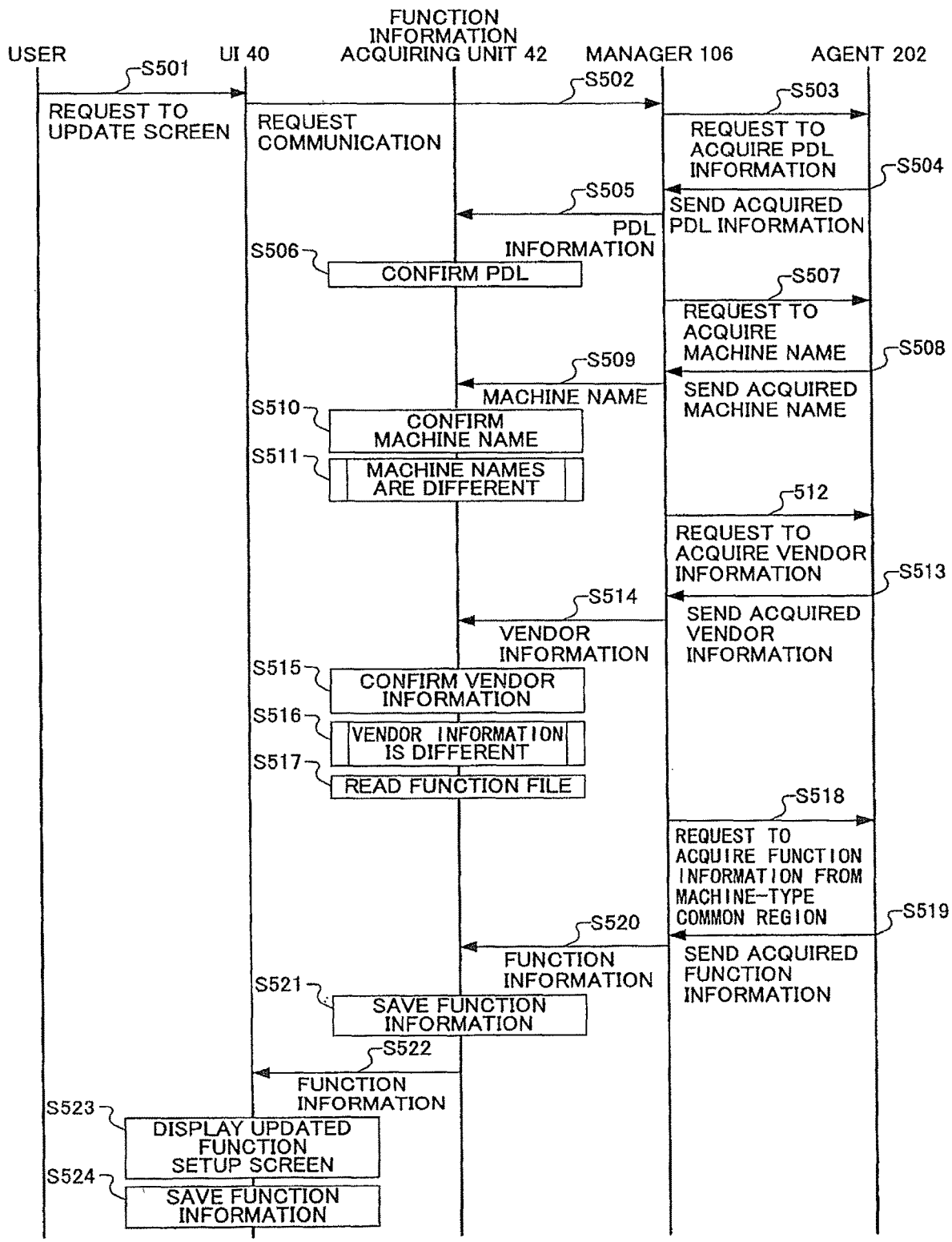

FIG.21

```
                                    ┌─2102                    ┌─2100
<machine name="OtherPrinter">
        <option name="Color">
                <suboption name="Color">    ┐
                        <id name="4"/>       ├─2120
                </suboption>        └─2122  ┘              ┐
                <suboption name="Mnochrome"> ┐             ├─2110
                        <id name="1"/>       ├─2130        │
                </suboption>        └─2132   ┘             ┘
        </option>
                                  ┌─2140
        <option name="Tray"/>
</machine>
```

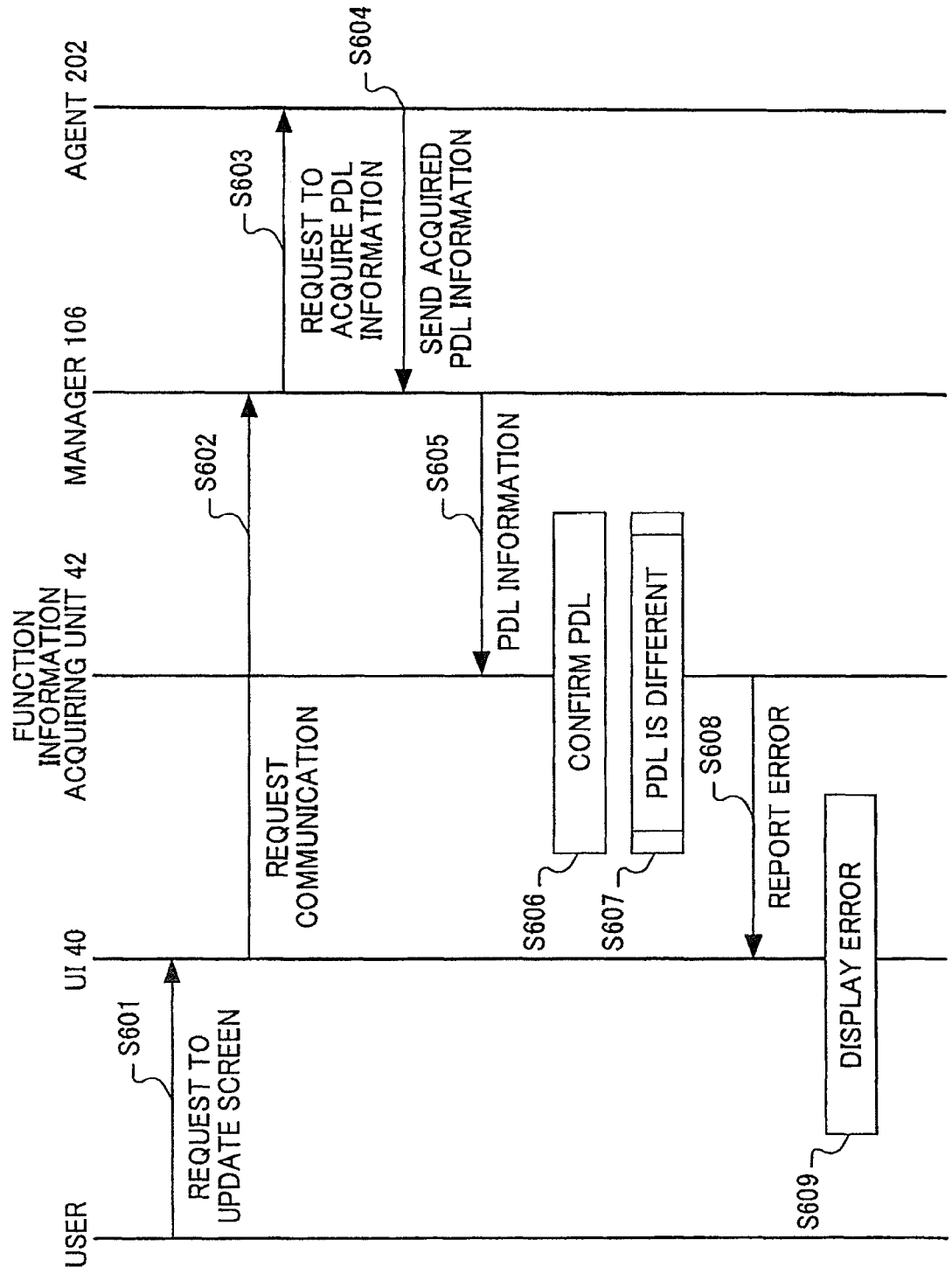

INFORMATION PROCESSING APPARATUS, METHOD, SYSTEM, AND MEDIUM, WITH SETUP PAGE THAT SHOWS INFORMATION INDICATING FUNCTIONS

CROSS REFERENCE TO RELATED APPLICATIONS

This application is a continuation of U.S. patent application Ser. No. 16/353,547, filed Mar. 14, 2019, which is a continuation of U.S. patent application Ser. No. 14/680,417, filed Apr. 7, 2015, now U.S. Pat. No. 10,275,195, which is a continuation of U.S. patent application Ser. No. 11/898,177, filed Sep. 10, 2007, now U.S. Pat. No. 9,025,193, which are incorporated by reference in their entireties. This application also claims priority to Japan 2006-251900 filed Sep. 15, 2006 and Japan 2007-143646 filed May 30, 2007.

BACKGROUND OF THE INVENTION

1. Field of the Invention

The present invention relates to an information processing apparatus capable of acquiring, from a device connected thereto, configuration information for a setup corresponding to the device according to the configuration information, a method performed by the information processing apparatus, a program product for causing a computer to function as the information processing apparatus, a recording medium that stores therein the program product, and an information processing system in which the information processing apparatus and the device are connected in such a manner that communication can be performed therebetween.

2. Description of the Related Art

An information processing apparatus such as a personal computer (hereinafter, simply referred to as "PC") can be connected to a peripheral device such as a printer, a scanner, or a facsimile machine (FAX) via a network or in a serial manner. In such a case, the PC is provided with a device driver for converting data, which are created by or viewed with an application installed therein, into data that are processable by the peripheral device.

For example, when an image forming apparatus such as a laser printer (LP) or a multifunction peripheral (MFP) (hereinafter, simply referred to as "printer") is connected to the PC, the PC is typically provided with a printer driver dedicated for the printer. Accordingly, data created by or viewed with an application in the PC can be converted into page description language (PDL) data that are processable by the printer.

Generally, each printer uses a printing setup based on functions (options) provided therein, which printing setup is different from those of other printers. Printer functions include functions that are common to all types of printers regardless of the machine type and/or the vendor, and functions that are determined based on option configurations installed in each printer. Option configurations differ according to the machine type and/or the vendor. Each printer is dependent on its option configuration and can have different functions from other printers.

In the conventional technology, there is a printer driver capable of responding to any type of printer by specifying setups only for functions common to all types of printers with different option configurations, without depending on each of their option configurations.

Furthermore, there is also known a technology in which the PC performs bidirectional communication with the printer, acquires the option configuration installed in the printer, and reflects the acquired option configuration in the printer driver for a printing setup to make use of functions of the printer.

This technology is disclosed in, for example, Japanese Laid-Open Patent Application No. 2002-259085 (Patent Document 1) and Japanese Laid-Open Patent Application No. 2002-175258 (Patent Document 2).

Patent Document 1: Japanese Laid-Open Patent Application No. 2002-259085

Patent Document 2: Japanese Laid-Open Patent Application No. 2002-175258

However, the above-described printer driver capable of responding to any type of printer can specify setups only for the functions common to the printers. Hence, only some of the functions of each printer can be used.

In the conventional technology disclosed in Patent Documents 1 and 2, the printer driver can specify detailed setups for functions of printers that are recognized beforehand, but not for printers that are not recognized beforehand.

SUMMARY OF THE INVENTION

The present invention provides an information processing apparatus, a method, a system, a program product, and a recording medium in which one or more of the above-described disadvantages are eliminated.

A preferred embodiment of the present invention provides an information processing apparatus, a method, a system, a program product, and a recording medium capable of making full use of functions of a device according to the type of device.

An embodiment of the present invention provides an information processing apparatus capable of acquiring, from a device connected to the information processing apparatus, configuration information concerning the device for a setup corresponding to the device according to the configuration information, the information processing apparatus including a function file storage configured to hold a function file describing a function of the device; a device classifying unit configured to classify the device into a category according to the configuration information acquired from the device; an information acquiring unit configured to acquire, from the device, information concerning the function described in the function file corresponding to the category into which the device is classified by the device classifying unit; and a display unit configured to display a setup page used for the setup corresponding to the device, according to the information acquired by the information acquiring unit.

An embodiment of the present invention provides a program product for causing an information processing apparatus, which is capable of acquiring, from a device connected to the information processing apparatus, configuration information concerning the device for a setup corresponding to the device according to the configuration information, to function as a device classifying unit configured to classify the device into a category according to the configuration information acquired from the device; an information acquiring unit configured to acquire, from the device, information concerning a function described in a function file corresponding to the category into which the device is classified by the device classifying unit; and a display unit configured to display a setup page used for the setup corresponding to the device, according to the information acquired by the information acquiring unit.

An embodiment of the present invention provides a method of acquiring configuration information concerning a device to which connection is made for a setup corresponding to the device according to the configuration information, the method including a device classifying step of classifying the device into a category according to the configuration information acquired from the device; an information acquiring step of acquiring, from the device, information concerning a function described in a function file corresponding to the category into which the device is classified at the device classifying step; and a displaying step of displaying a setup page used for the setup corresponding to the device, according to the information acquired at the information acquiring step.

An embodiment of the present invention provides an information processing system in which an information processing apparatus and a device are connected in such a manner that communication can be performed therebetween, and the information processing apparatus acquires, from the device, configuration information concerning the device for a setup corresponding to the device according to the configuration information, wherein the information processing apparatus includes a function file storage configured to hold a function file describing a function of the device; a device classifying unit configured to classify the device into a category according to the configuration information acquired from the device; an information acquiring unit configured to acquire, from the device, information concerning the function described in the function file corresponding to the category into which the device is classified by the device classifying unit; and a display unit configured to display a setup page used for the setup corresponding to the device, according to the information acquired by the information acquiring unit, wherein the device includes a configuration information storage configured to hold the configuration information of the device and the information concerning the function executable by the device; and a configuration information transmitting unit configured to acquire, from the configuration information storage, the configuration information or the information concerning the function executable by the device, and send the acquired configuration information or information to the image processing apparatus, in response to receiving a request from the image processing apparatus.

According to one embodiment of the present invention, an information processing apparatus, a method, a system, a program product, and a recording medium are provided, which are capable of making full use of functions of a device, according to the type of device.

BRIEF DESCRIPTION OF THE DRAWINGS

Other objects, features and advantages of the present invention will become more apparent from the following detailed description when read in conjunction with the accompanying drawings, in which:

FIG. 17 illustrates an example of a description of the function file according to the third embodiment of the present invention;

FIG. 19 is a sequence diagram of an operation performed by a printer driver for classifying a printer according to a fourth embodiment of the present invention;

FIG. 21 illustrates an example of a description of the function file according to the fourth embodiment of the present invention;

FIG. 23 is a sequence diagram of an operation performed by a printer driver for cancelling the operation according to a fifth embodiment of the present invention.

DETAILED DESCRIPTION OF THE PREFERRED EMBODIMENTS

A description is given, with reference to the accompanying drawings, of an embodiment of the present invention.

[Configuration]

Figure 1:
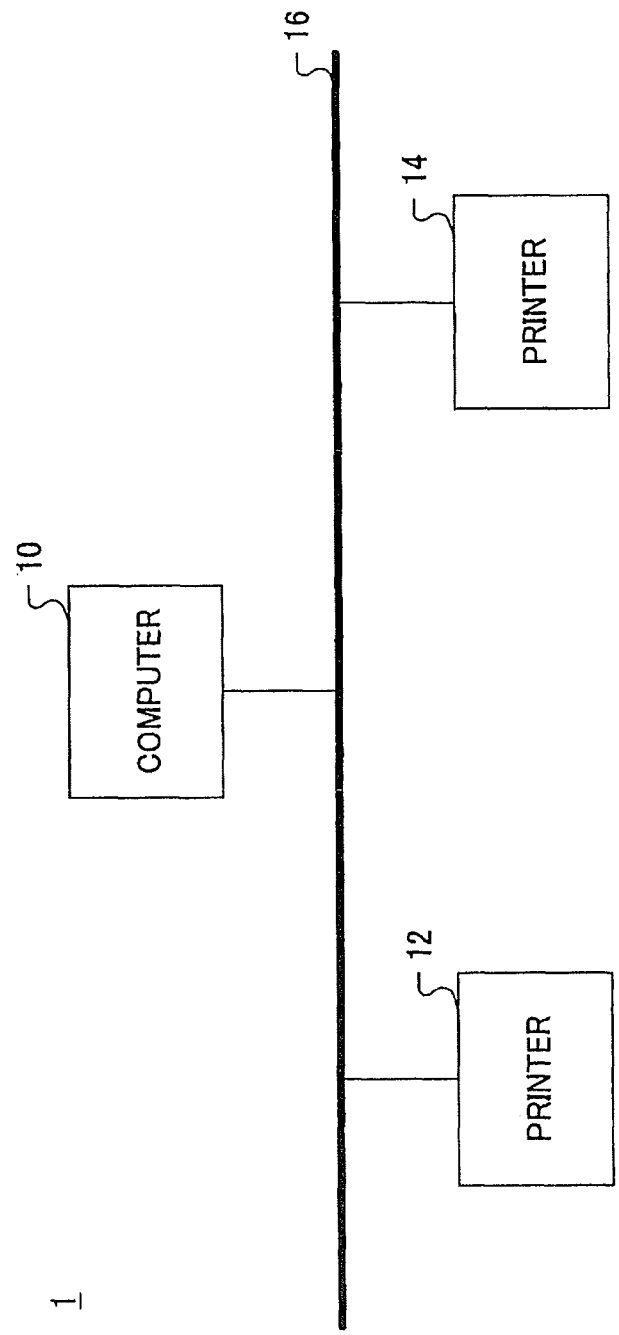
FIG. 1 illustrates a network configuration of an information processing system according to an embodiment of the present invention.

FIG. 1 illustrates a network configuration of an information processing system according to an embodiment of the present invention.

In FIG. 1, an information processing system 1 includes a computer 10 acting as an information processing apparatus, first and second printers 12 and 14, and a network 16 through which these elements are interconnected in such a manner that data communication can be performed therebetween.

The computer 10 can be a personal computer (PC), a PDA (Personal Digital Assistant), or a mobile phone capable of displaying a user interface (UI) based on an OS (Operating System).

The first and second printers 12 and 14 operate according to a request received from the computer 10. In the present embodiment, the first and second printers 12 and 14 are image forming apparatuses such as a laser printer (LP) or a multifunction peripheral (MFP).

FIG. 1 illustrates only one computer and two printers; however, in reality, there can be more elements provided. Furthermore, as shown in FIG. 1, the computer and the printers are connected via a network such as a local area network (LAN) or the Internet; however, they can also be connected in a serial manner by a USB, for example.

In the following example, the information processing system 1 is a network system managed by the SNMP (Simple Network Management Protocol). SNMP is used for managing a network system by monitoring, via the network, devices connected to the network.

Figure 2:
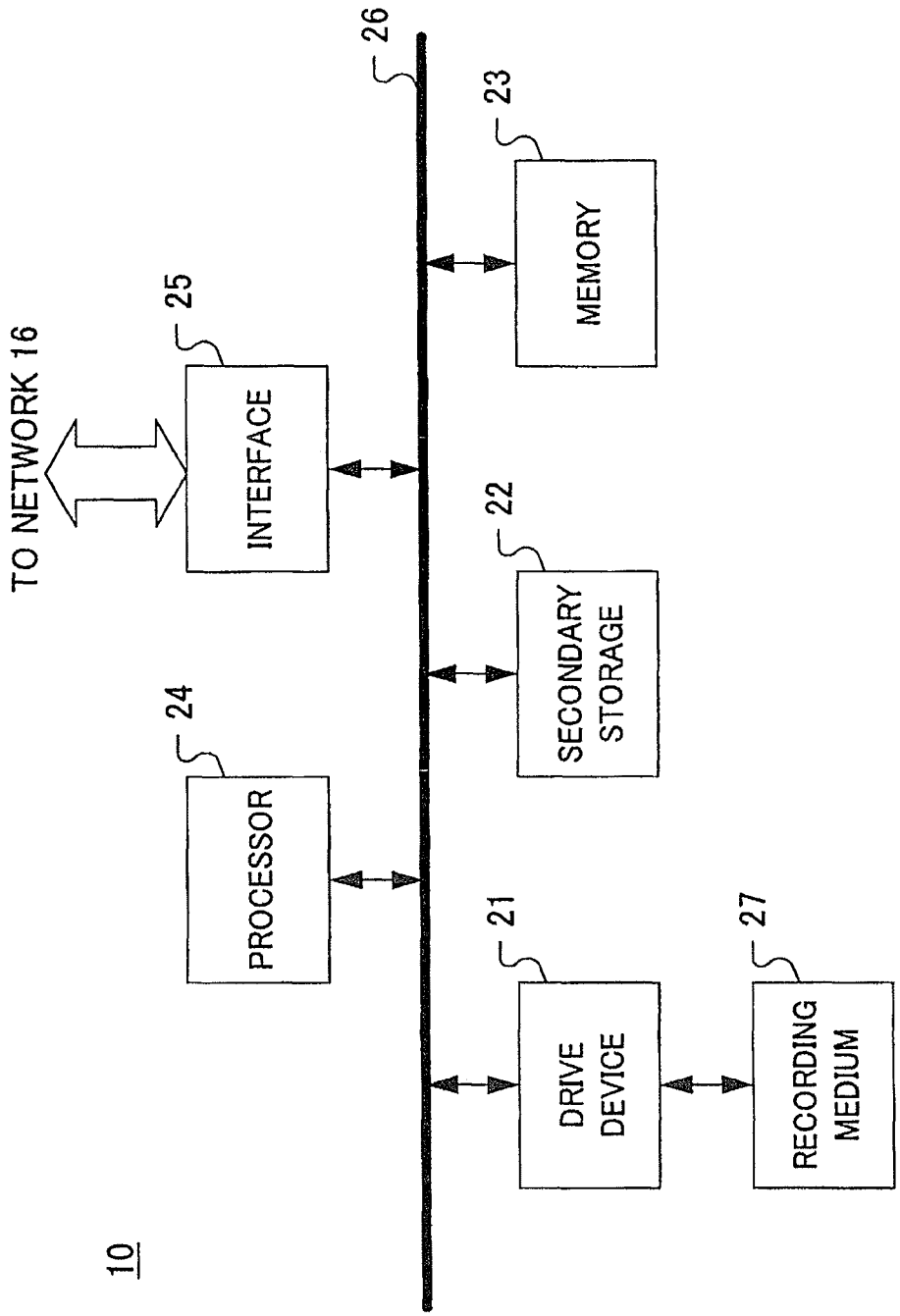
FIG. 2 illustrates a hardware configuration of a computer according to an embodiment of the present invention.

FIG. 2 illustrates a hardware configuration of the computer according to an embodiment of the present invention. As shown in FIG. 2, the computer 10 includes a drive device 21, a secondary storage 22, a memory 23, a processor 24, and an interface 25, which are interconnected by a bus 26. A program for realizing a process performed by the computer 10 is provided with a recording medium 27 such as a CD-ROM.

The drive device 21 is used for reading the recording medium 27. The recording medium 27 holding the program can be inserted into the drive device 21, and the program can be installed in the secondary storage 22 from the recording medium 27 via the drive device 21. In the present embodiment, the program held in the recording medium 27 can be any device driver such as a printer driver or a PC-FAX driver. However, as a matter of simplification, the program is hereinafter described as a printer driver.

The secondary storage 22 is for storing the installed program and necessary files and data. When an instruction to start up the program is received, the memory 23 reads the program from the secondary storage 22 and holds it therein. The processor 24 is for executing functions (options) pertaining to the computer 10 in accordance with the program held in the memory 23. The interface 25 is for connecting the computer 10 to the network 16 shown in FIG. 1.

Figure 3:
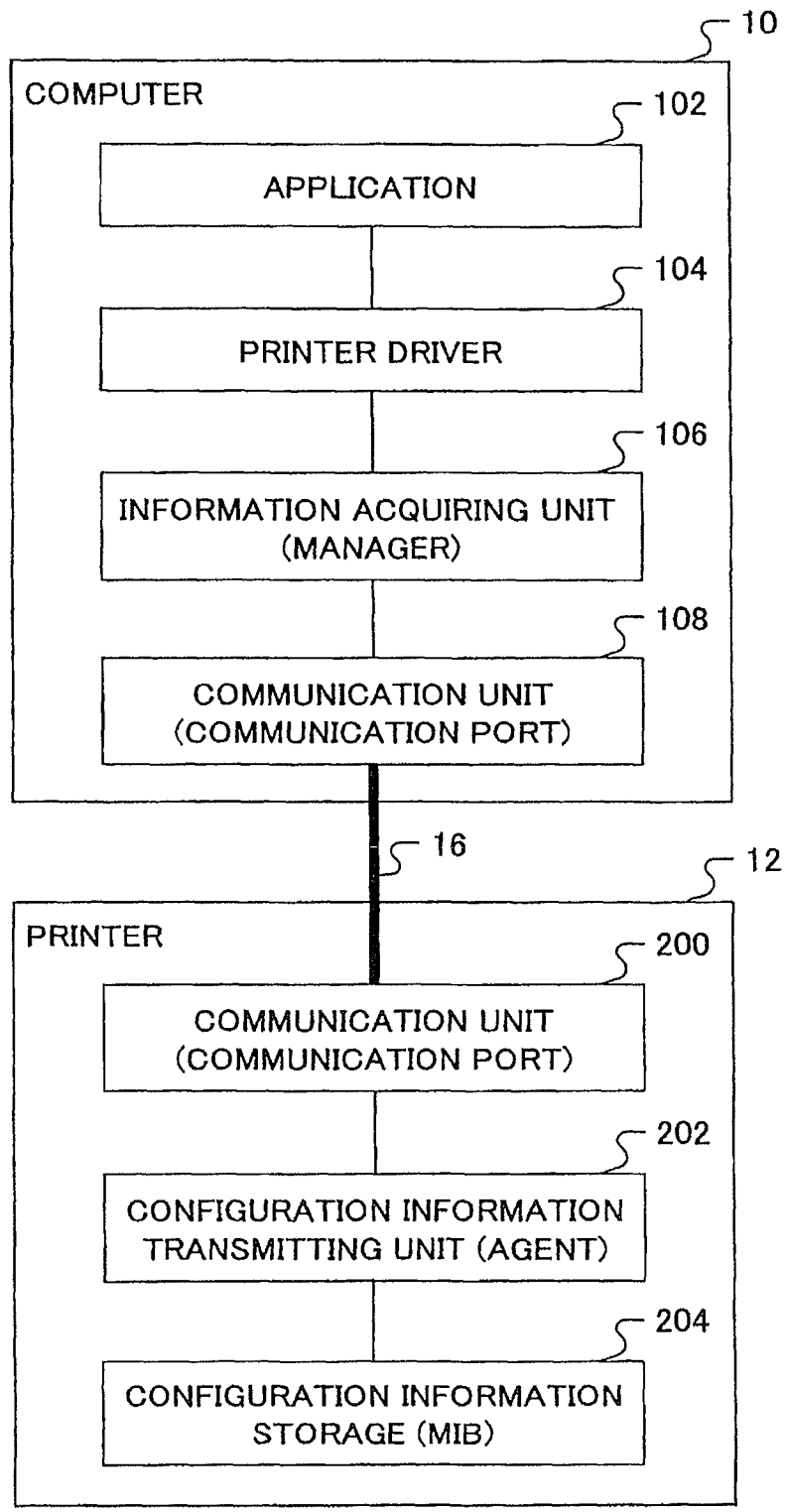
FIG. 3 illustrates a functional configuration of the computer according to an embodiment of the present invention.

FIG. 3 illustrates a functional configuration of the computer 10. As shown in FIG. 3, the computer 10 is connected to the printer 12 via the network 16. The computer 10 includes an application 102, a printer driver 104, an information acquiring unit 106, and a communication unit 108.

The application 102 is a program that operates on an OS such as Windows (registered trademark). For example, the application 102 is a general-purpose application such as document creation software and spreadsheet software.

The printer driver 104 is a module for converting image data created by or viewed with the application 102 into so-called page description language (PDL) data that are processable by the printer 12. The conversion is performed in response to an internal command of the OS.

The information acquiring unit 106 functions as a module for communicating with the printer 12, and acquiring and/or specifying configuration information of the printer 12. In a network system managed with SNMP, the information acquiring unit 106 is typically referred to as a manager. Hereinafter, the information acquiring unit 106 is referred to as a manager. The manager 106 can be part of a module for spooling PDL data generated in the printer driver 104.

The communication unit 108 is a so-called communication port for communicating and exchanging information with the printer 12. Hereinafter, the communication unit 108 is referred to as a communication port.

Meanwhile, as shown in FIG. 3, the printer 12 includes a communication unit 200 acting as a communication port, a configuration information transmitting unit 202, and a configuration information storage 204.

In response to a request received from the computer 10 via the network 16, the configuration information transmitting unit 202 acquires configuration information stored in the configuration information storage 204 and sends the acquired configuration information to the computer that is the request source. In a network system managed with SNMP, the configuration information transmitting unit 202 is typically referred to as an agent. Hereinafter, the configuration information transmitting unit 202 is referred to as an agent. "Configuration information" pertains to the printer 12, including the description format of PDL, machine type identification information such as the name of the machine type (machine name) or a device ID, vendor information of the printer 12, and function information pertaining to functions (options) that may be used by the printer 12.

The configuration information storage 204 stores the configuration information of the printer 12. In a network system managed with SNMP, the configuration information storage 204 is typically referred to as an MIB (Management Information Base). Hereinafter, the configuration information storage 204 is referred to as an MIB.

Figure 4:
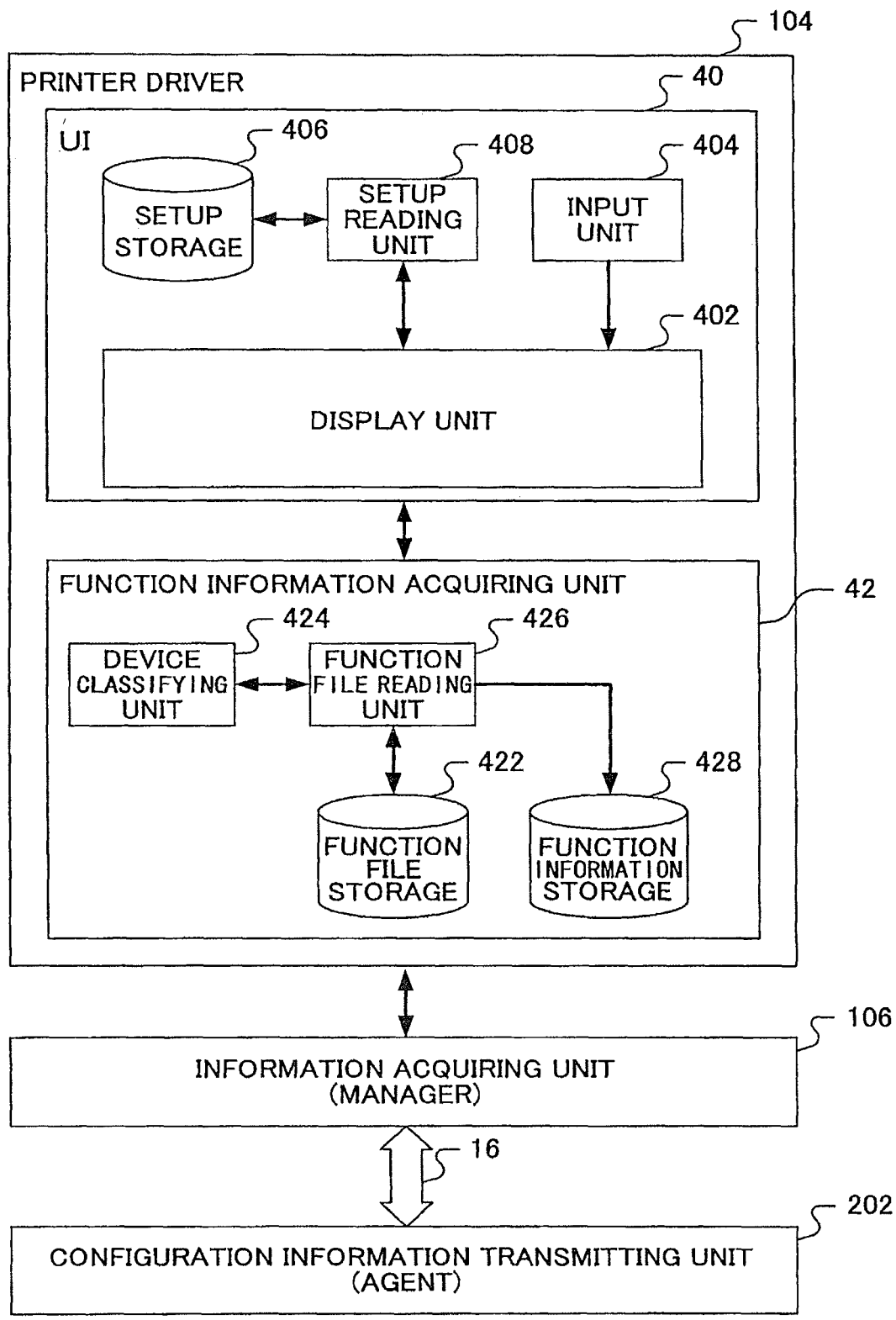
FIG. 4 is a block diagram of a printer driver in the computer according to an embodiment of the present invention.

FIG. 4 is a block diagram of the printer driver 104 in the computer 10 according to an embodiment of the present invention. As shown in FIG. 4, the printer driver 104 is connected to the manager 106. The printer driver 104 includes a user interface (UI) 40 and a function information acquiring unit 42. The manager 106 is connected to the agent 202 of the printer 12 (see FIG. 3) via the network 16.

The UI 40 displays a screen (page) of setups of the printer 12, so that functions of the printer 12 can be specified based on user input. The UI 40 includes a display unit 402, an input unit 404, a setup storage 406, and a setup reading unit 408. The display unit 402 generates a screen for specifying functions of the printer 12 and displays the screen on a display device (not shown) such as a monitor. The display unit 402 receives user input for specifying functions. The input unit 404 is used by a user to input setups for functions of the printer 12. The input unit 404 can be an input device such as a mouse or a keyboard. The setup storage 406 is for storing previous setups for functions of the printer 12. The setup reading unit 408 reads the setups for the functions of the printer 12 saved in the setup storage 406, and sends the setups to a function information storage 428 of the function information acquiring unit 42, in order to reflect the setups in a setup screen displayed by the display unit 402.

The function information acquiring unit 42 acquires function information stored in the MIB 204 (see FIG. 3) of the printer 12 and reflects the function information in the setup screen displayed by the display unit 402 of the UI 40. The function information acquiring unit 42 includes a function file storage 422, a device classifying unit 424, a function file reading unit 426, and the function information storage 428.

The function file storage 422 includes a first function file describing functions common to printers of the same machine type, a second function file describing functions common to all of the printers handled by the same vendor regardless of the machine type of the printer, and a third function file describing functions common to all of the printers regardless of the machine type of the printer or the vendor.

The device classifying unit 424 classifies the printer 12 into one of the following categories according to configuration information acquired from the printer 12 such as the machine name or vendor information.

(1) A printer already known to the printer driver 104 (a product of the same vendor, and the printer driver 104 has a function file dedicated for the printer)

(2) A printer unknown to the printer driver 104 (a product of the same vendor, but the printer driver 104 does not have a function file dedicated for the printer)

(3) A printer unknown to the printer driver 104 (a product of a different vendor, and the printer driver 104 does not have a function file dedicated for the printer)

The function file reading unit 426 is for reading a function file from the function file storage 422 according to the category into which the printer 12 is classified by the device classifying unit 424. The function information storage 428 temporarily stores, during operation, the function information pertaining to the function described in the function file read by the function file reading unit 426. The function information temporarily saved in the function information storage 428 is eventually saved in the setup storage 406 of the UI 40.

Figure 5:
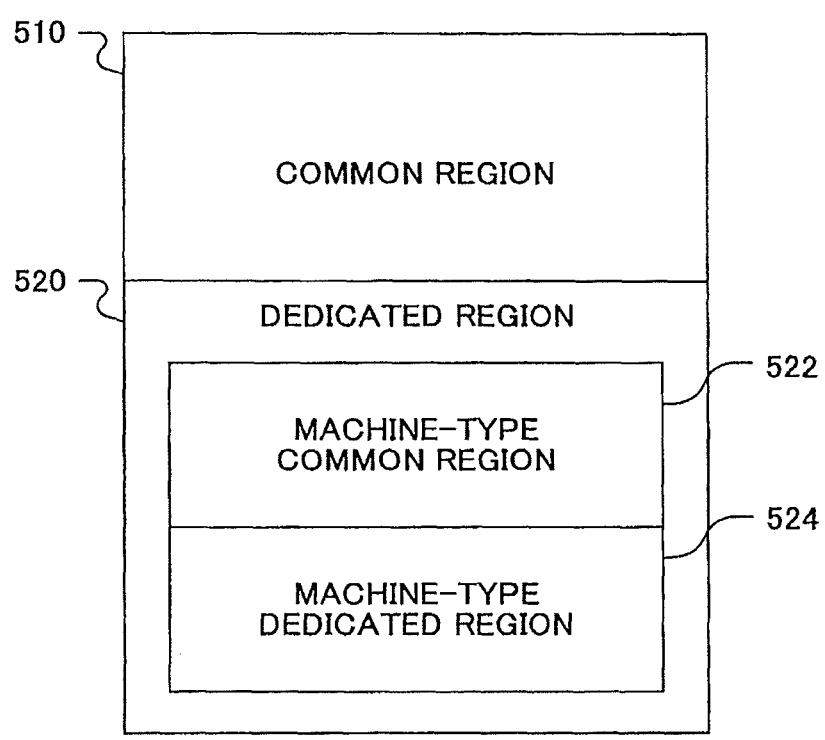
FIG. 5 illustrates a data configuration of an MIB in the printer according to an embodiment of the present invention.

FIG. 5 illustrates a data configuration of the MIB 204 shown in FIG. 3. As shown in FIG. 5, the MIB 204 includes a common region 510 and a dedicated region 520.

The common region 510 stores information common to all of the printers regardless of the vendor or the machine type.

The dedicated region 520 is a vendor-free region, including a machine-type common region 522 and a machine-type dedicated region 524. The machine-type common region 522 stores function information according to a common rule for products of the same vendor. The machine-type dedicated region 524 stores function information according to different rules for each of the machine types that are products of the same vendor.

The following describes some of the operations performed by the computer 10.

[Operations]

Figure 6:
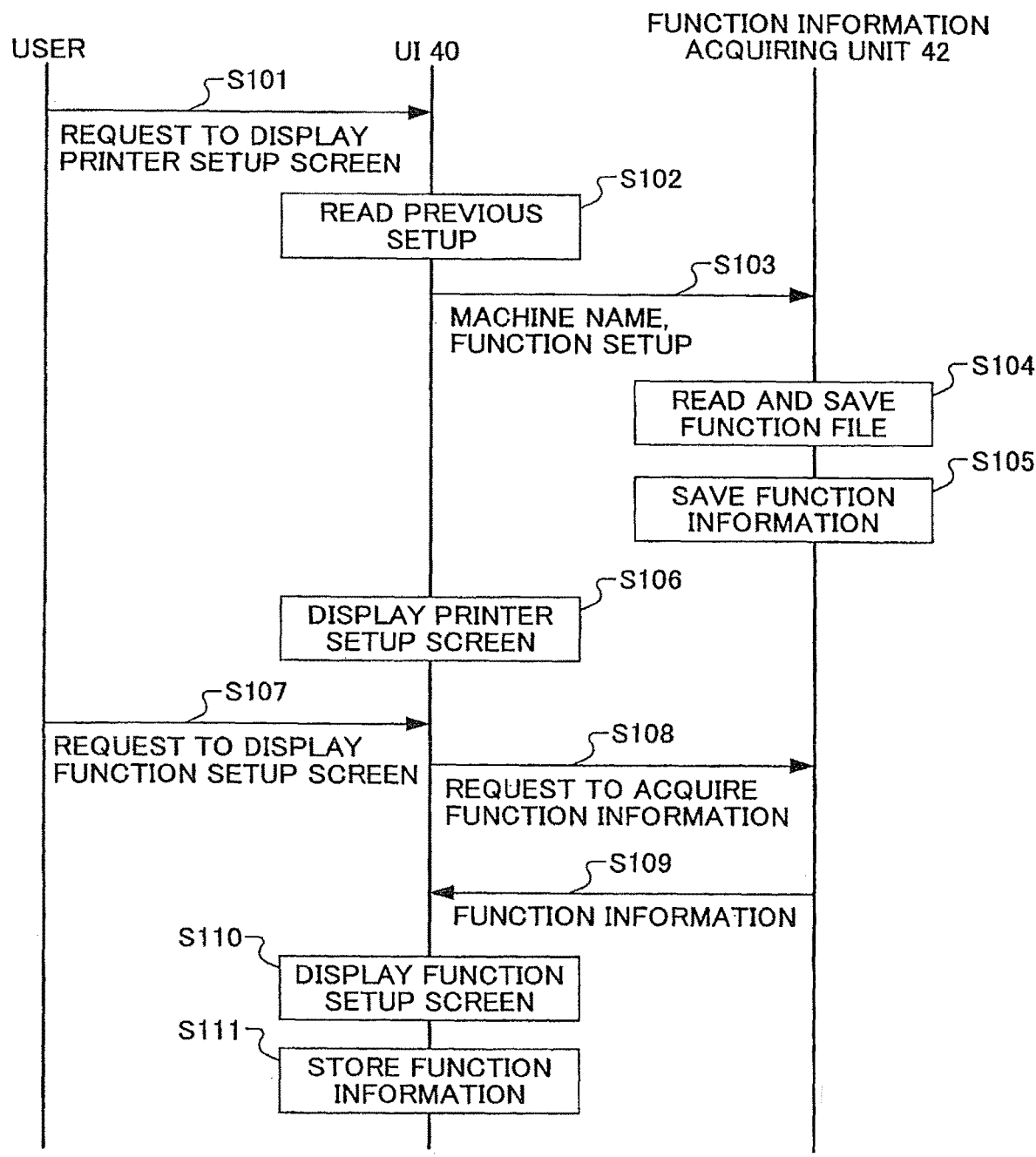
FIG. 6 is a sequence diagram of an operation performed by the computer for displaying a printer function setup screen for the printer according to an embodiment of the present invention.

FIG. 6 is a sequence diagram of an operation performed by the computer 10 for displaying a printer function setup screen for the printer 12.

First, in step S101, a user makes a request 25 to specify setups for the printer 12, using the input unit 404 of the UI 40. Specifically, if the OS is Windows (registered trademark), the user will select "printer" in the "control panel" and select "property" from the right-click menu while selecting the corresponding printer. In response to the request from the user, in step S102, the UI 40 reads the previous setup saved in the setup storage 406 with the setup reading unit 408. The previous setup includes the machine name of the printer previously connected to the communication port 108 and the function setup for the function of the previous printer. In step S103, the UI 40 sends, to the function information acquiring unit 42, at least the machine name and the function setup included in the setup read by the setup reading unit 408 in step S102. In step S104, in the function information acquiring unit 42, the function file reading unit 426 reads, from among the plurality of function files stored in the function file storage 422, a function file corresponding to the machine name received from the UI 40 in step S103. The read function file is saved in the function information storage 428. In step S105, the function information storage 428 merges the function setup received from the UI 40 in step S103 with the function file saved in step S104, and saves them as function information. Next, in step S106, the UI 40 displays a printer setup screen on the display unit 402 according to the function file into which the function setup has been merged at the function information storage 428.

Then, in step S107, the user uses the input unit 404 to input a request in the printer setup screen displayed by the display unit 402 to display a function setup screen. For example, the function setup screen can be displayed in a tab format in the printer setup screen. In response to the user's request, in step S108, the UI 40 requests the function information acquiring unit 42 to provide function information. In step S109, the function information acquiring unit 42 sends the function information temporarily saved in the function information storage 428 to the UI 40. In step S110, the UI 40 causes the display unit 402 to display a function setup screen based on this function information. Last, in step S111, the UI 40 saves the function information in the setup storage 406. The function information saved in the setup storage 406 includes information pertaining to the function setup, which is used as the "previous setup" when a next request to display a printer setup screen is received.

As described above, when the printer driver 104 is called by the application, the printer driver 104 selects the function file of the printer used previously, and starts operating. Incidentally, immediately after the printer driver 104 is initially installed in the computer 10, the printer driver 104 selects a function file of a default setup specified at the time of factory shipment or by the printer administrator.

Figure 10B:
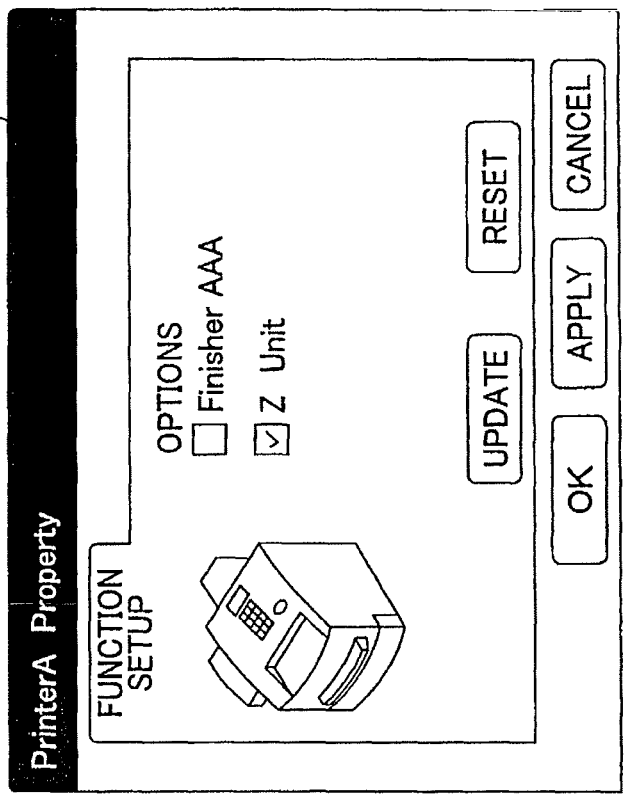
FIGS. 10A and 10B illustrate examples of the function setup screen according to the first embodiment of the present invention.
Figure 10A:
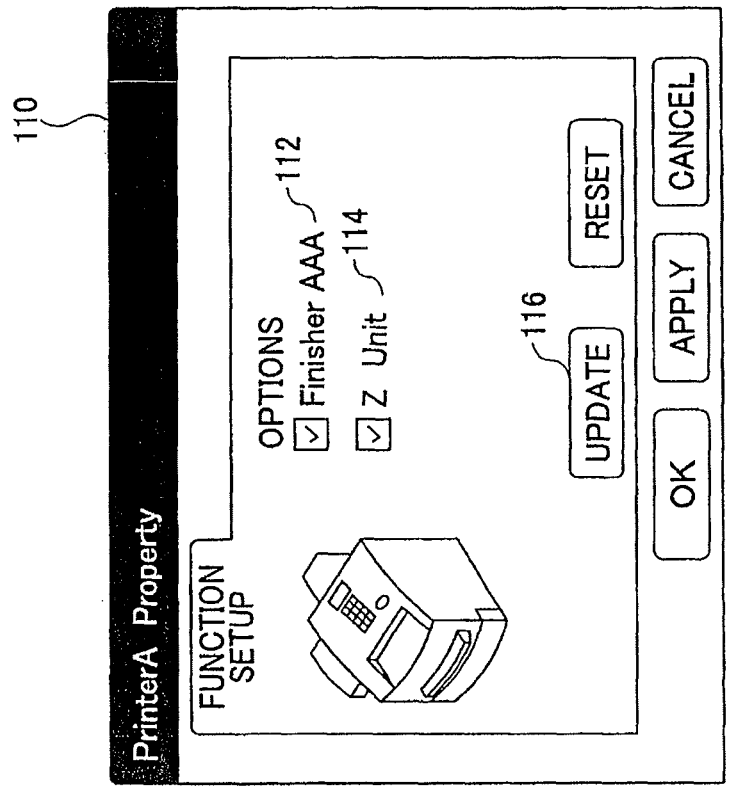

The function setup screen includes an "update" button (see FIGS. 10A, 10B). When this button is pushed by a user, the printer driver 104 classifies the printer 12 by acquiring information from the printer 12.

The printer driver 104 selects an appropriate function file according to the category into which the printer 12 is classified, acquires, from the printer 12, function information pertaining to the function described in the selected function file, and operates according to the acquired function information.

The following are detailed descriptions of operations performed by the computer 10 for classifying the printer 12.

First Embodiment

In the first embodiment, an operation of the computer 10 is described in a case where the printer 12 that is connected is already known to the printer driver 104 (a product of the same vendor, and the printer driver 104 has a function file dedicated for the printer), and corresponds to a function file already read by the printer driver 104. This operation is described with reference to the sequence diagram shown in FIG. 7.

First, in step S201, a user makes a request to update the function setup screen, using the input unit 404 of the UI 40. Specifically, the user presses the "update" button (see FIG. 10A) in the function setup screen displayed by the display unit 402 of the UI 40. In response to the request from the user, in step S202, the UI 40 specifies a port name and requests the manager 106 to perform bidirectional communication with the printer 12 of the specified port name.

In response to the request from the UI 40, in step S203, the manager 106 sends a request to the agent 202 of the printer 12 via the network 16, to acquire PDL information pertaining to the description format of PDL. In step S204, the agent 202 acquires PDL information from the common region 510 of the MIB 204, and sends the acquired PDL information to the manager 106. In step S205, the manager 106 sends the PDL information acquired from the printer 12 to the function information acquiring unit 42. In step S206, in the function information acquiring unit 42, the device classifying unit 424 confirms whether the PDL description format of the printer 12 corresponds to the printer driver 104, based on the PDL information acquired from the printer 12.

If the PDL description format of the printer 12 corresponds to the printer driver 104, in step S207, the function information acquiring unit 42 will cause the manager 106 to send a request to the agent 202 of the printer 12 via the network 16, to acquire the machine name. In step S208, the agent 202 acquires the machine name from the common region 510 of the MIB 204, and sends it to the manager 106. In step S209, the manager 106 sends the machine name acquired from the printer 12 to the function information acquiring unit 42. In step S210, in the function information acquiring unit 42, the device classifying unit 424 confirms whether the machine name described in the function file read beforehand (in step S105 in FIG. 6) is the same as the machine name acquired from the printer 12.

If the machine name described in the function file is the same as the machine name acquired from the printer 12, in step S211, the function information acquiring unit 42 will cause the manager 106 to send a request to the agent 202 of the printer 12 via the network 16, to acquire function information pertaining to the function (option) described in the function file read beforehand, from the machine-type dedicated region 524 of the MIB 204. In step S212, the agent 202 acquires function information from the machine-type dedicated region 524 of the MIB 204, and sends the acquired function information to the manager 106. In step S213, the manager 106 sends the function information acquired from the printer 12 to the function information acquiring unit 42. In step S214, the function information acquiring unit 42 saves the function information acquired from the printer 12 in the function information storage 428. In step S215, the saved function information is sent from the function information acquiring unit 42 to the UI 40. In step S216, the UI 40 causes the display unit 402 to display the updated function setup screen based on this function information. When the updated function setup screen is displayed, and the user presses an "apply" button or an "OK" button (see FIG. 10B), which is displayed outside the tab of the function setup screen but inside the same printer setup screen, in step S217, the UI 40 saves the function information in the setup storage 406.

Figure 8:
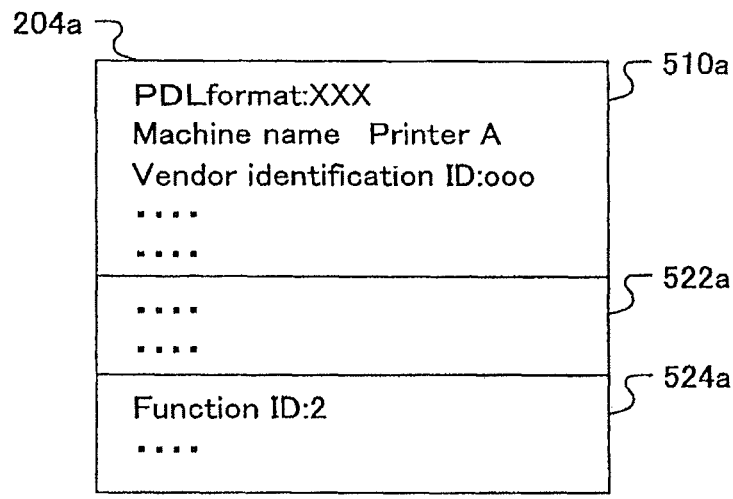
FIG. 8 illustrates configuration information stored in the MIB of the printer according to the first embodiment of the present invention.

FIG. 8 illustrates configuration information stored in the MIB 204 of the printer 12 according to the first embodiment. As shown in FIG. 8, an MIB 204a according to the first embodiment includes a PDL description format, a machine name, and a vendor identification ID in a common region 510a and a function ID in a machine-type dedicated region 524a.

Figure 7:
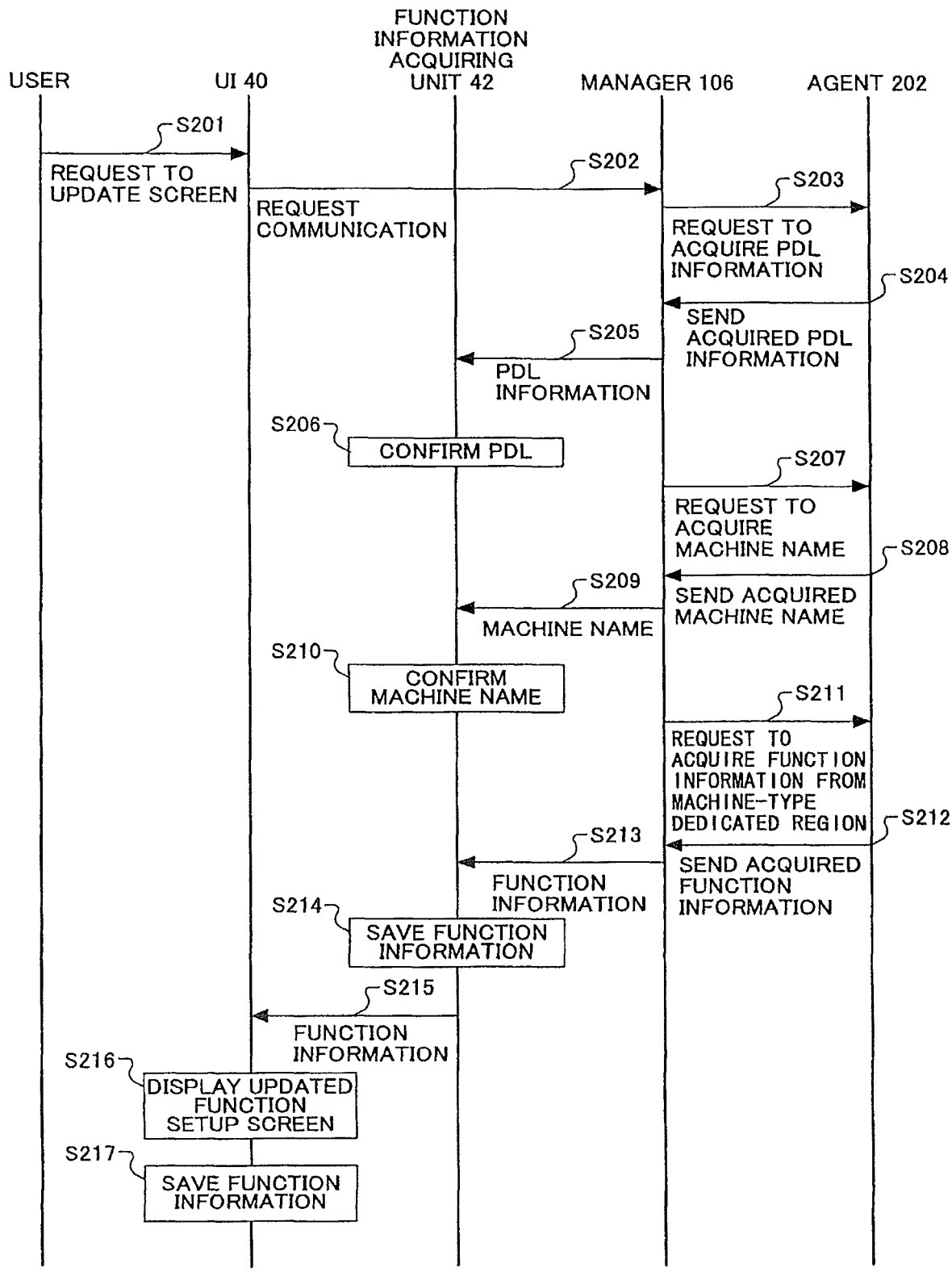
FIG. 7 is a sequence diagram of an operation performed by a printer driver for classifying a printer according to a first embodiment of the present invention.

The vendor identification ID is for identifying the vendor of the printer, which can be sent to the manager 106 from the agent 202 of the printer 12, together with the machine name, in step S208 of FIG. 7. The printer driver 104 can confirm whether the printer 12 is already known based on the machine name or confirm whether the printer 12 is a product for the same vendor based on the vendor identification ID. Accordingly, the printer driver 104 can classify the printer 12 into one of the three categories described above.

The function ID is for identifying the function that can be executed by the printer. A different function ID is assigned to each function. The function that can actually be used by the printer 12 is represented by option configuration information including the function ID.

As for the printer 12 to be presently used in the first embodiment, the PDL description format is "XXX", the machine name of the printer 12 is "PrinterA", the vendor identification ID is "ooo", the printer 12 is a product of the same vendor as the printer driver 104, and a function having a function ID "2" can be executed.

Figure 9:
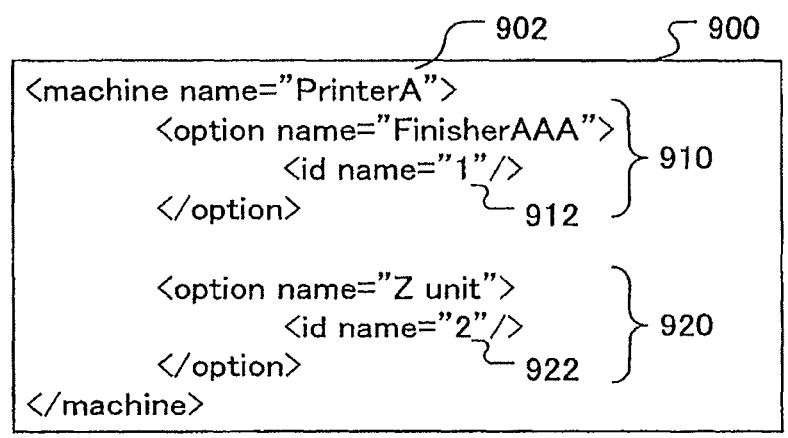
FIG. 9 illustrates an example of a description of the function file according to the first embodiment of the present invention.

FIG. 9 illustrates an example of a description of the function file according to the first embodiment. As shown in FIG. 9, in a function file 900, there are described a machine name 902 of the printer corresponding to the function file 900 and a function 910 and a function 920 that can be used by the printer. The function 910 and the function 920 are respectively given a function ID 912 and a function ID 922.

In the first embodiment, "PrinterA" is described as the machine name 902. For the first function 910, the function name (option name) is described as "Finisher AAA" and the function ID 912 is described as "1". For the second function 920, the function name (option name) is described as "Z Unit" and the function ID 922 is described as "2".

In the following, the operation described with reference to FIG. 7 is described in further detail, assuming that the printer 12 has the configuration information shown in FIG. 8 (MIB 204a) and the printer driver 104 has read beforehand the function file 900 shown in FIG. 9.

When the manager 106 sends a request to the agent 202 of the printer 12 to acquire the machine name (step S207), the agent 202 acquires the machine name="PrinterA" from the common region 510a of the MIB 204a, and sends it to the manager 106 (step S208). The manager 106 sends this machine name to the function information acquiring unit 42 (step S209). In the function information acquiring unit 42, the device classifying unit 424 compares the machine name="PrinterA" acquired from the printer 12 with the machine name 902 described in the function file 900 read beforehand, and determines that the printer 12 corresponds to the function file 900 (step S210).

The function information acquiring unit 42 causes the manager 106 to send a request to the agent 202 of the printer 12 via the network 16, to acquire function information pertaining to the functions 910 and 920 described in the function file 900, from the machine-type dedicated region 524a of the MIB 204a (step S211). In response to the acquisition request from the manager 106, the agent 202 acquires function information pertaining to the functions having function IDs corresponding to the functions 910 and 920 from the machine-type dedicated region 524a. However, the machine-type dedicated region 524a only holds the function ID="2" corresponding to the second function 920, and therefore, the agent 202 only acquires function information pertaining to the function 920 having the function ID="2", and sends the acquired function information to the manager 106 (step S212). The function information is sent from the manager 106 to the function information acquiring unit 42 (step S213), and is saved in the function information storage 428 (step S214). The function information storage 428 can hold information indicating that the function information of the function having a function ID="1" cannot be acquired, and therefore, this function cannot be presently used.

FIGS. 10A and 10B illustrate examples of the function setup screen according to the first embodiment. FIG. 10A illustrates a screen based on the previous function information; FIG. 10B illustrates an updated screen that is updated based on the function information acquired from the printer to be presently used, which is displayed after the "update" button has been pressed in the screen shown in FIG. 10A.

A function setup screen 110 before being updated displays function names of all functions (options) 112, 114 of the printer previously used, i.e., "Finisher AAA" and "Z Unit", and also displays check boxes indicating whether the corresponding functions have actually been able to be used by the printer. If the previously used printer has been capable of actually using all of the functions of its machine type, both of the check boxes will be checked (in an on status). Furthermore, the function setup screen 110 includes an "update" button 116, and when a user presses the "update" button 116, the operation shown in FIG. 7 is performed.

An updated function setup screen 120 is for specifying functions of the printer to be presently used. If the printer to be presently used is the same machine type as that of the previously used printer, the function setup screen 120 will be similar to the function setup screen 110. That is, the function setup screen 120 will display function names "Finisher AAA" and "Z Unit" of all functions (options) 112, 114 of the machine type, and will also display check boxes indicating whether the corresponding functions can actually be used by the printer to be presently used. However, if the printer to be presently used can only use the second function "Z Unit" 114, the check box corresponding to the first function 112 will not be checked (in an off status).

As described above, in the first embodiment, a computer confirms that a printer to be presently used is a known printer of the same machine type as a printer previously connected to the same communication port. Among all of the functions that can be executed by a printer of this machine type, the computer confirms which function can actually be executed by the printer to be presently used. The computer acquires, from the printer to be presently used, information pertaining to the function that can actually be used by the printer to be presently used. The computer can reflect information as to whether a function can actually be used/cannot be used by the present printer, in a setup screen for the printer.

In a conventional computer, a dedicated printer driver and a dedicated communication port need to be provided for each printer. Thus, in a case where the printer that is presently connected is of the same machine type as a printer that is usually connected to the same communication port, but has different additional functions, it may not be possible to use all of the functions executable by the printer that is presently connected. However, the computer according to the first embodiment has a file describing all of the functions executable by a printer of a particular machine type. Therefore, it is possible to connect a different printer of the same machine type as the previous printer to the same communication port to which the previous printer has been connected, and appropriately specify the functions of the different printer.

Second Embodiment

A second embodiment is similar to the first embodiment in that the printer 12 that is connected is already known to the printer driver 104 (a product of the same vendor as the printer driver 104, and the printer driver 104 has a function file dedicated for the printer). However, the printer 12 that is connected corresponds to a different function file from the function file read beforehand. An operation of the computer 10 for this case is described with reference to the sequence diagram shown in FIG. 11.

First, in step S301, a user makes a request to update the function setup screen, using the input unit 404 of the UI 40. Specifically, the user presses an "update" button (see FIG. 14A) in the function setup screen displayed by the display unit 402 of the UI 40. In response to the request from the user, in step S302, the UI 40 specifies a port name and requests the manager 106 to perform bidirectional communication with the printer 12 of the specified port name.

In response to the request from the UI 40, in step S303, the manager 106 sends a request to the agent 202 of the printer 12 via the network 16, to acquire PDL information pertaining to the description format of PDL. In step S304, the agent 202 acquires PDL information from the common region 510 of the MIB 204, and sends the acquired PDL information to the manager 106. In step S305, the manager 106 sends the PDL information acquired from the printer 12 to the function information acquiring unit 42. In step S306, in the function information acquiring unit 42, the device classifying unit 424 confirms whether the PDL description format of the printer 12 corresponds to the printer driver 104, based on the PDL information acquired from the printer 12.

If the PDL description format of the printer 12 corresponds to the printer driver 104, in step S307, the function information acquiring unit 42 will cause the manager 106 to send a request to the agent 202 of the printer 12 via the network 16, to acquire the machine name. In step S308, the agent 202 acquires the machine name from the common region 510 of the MIB 204, and sends it to the manager 106. In step S309, the manager 106 sends the machine name acquired from the printer 12 to the function information acquiring unit 42. In step S310, in the function information acquiring unit 42, the device classifying unit 424 confirms whether the machine name described in the function file read beforehand (in step S105 in FIG. 6) is the same as the machine name acquired from the printer 12.

In the second embodiment, in step S311, the device classifying unit 424 determines that the machine name described in the function file read beforehand and the machine name acquired from the printer 12 are different. In this case, in step S312, the function information acquiring unit 42 causes the manager 106 to send a request to the agent 202 of the printer 12 via the network 16, to acquire vendor information. In step S313, the agent 202 acquires the vendor information from the common region 510 of the MIB 204, and sends it to the manager 106. In step S314, the manager 106 sends the vendor information acquired from the printer 12 to the function information acquiring unit 42. In step S315, in the function information acquiring unit 42, the device classifying unit 424 confirms whether the vendor of the printer 12 is the same as that of the printer driver 104, based on the vendor information acquired from the printer 12.

If the printer 12 is a product of the same vendor as that of the printer driver 104, in step S316, in the function information acquiring unit 42, the function file reading unit 426 will search the function file storage 422 for a function file corresponding to the printer 12, based on the machine name acquired from the printer 12. As a result of the search, when a function file corresponding to the printer 12 is found in the function file storage 422, in step S317, the function file reading unit 426 reads, from the function file storage 422, the found function file corresponding to the printer 12, thus overwriting the function file previously read.

Next, in step S318, the function information acquiring unit 42 causes the manager 106 to send a request to the agent 202 of the printer 12 via the network 16, to acquire function information pertaining to the function described in the function file read in step S317, from the machine-type dedicated region 524 of the MIB 204. In step S319, the agent 202 acquires function information from the machine-type dedicated region 524 of the MIB 204, and sends the acquired function information to the manager 106. In step S320, the manager 106 sends the function information acquired from the printer 12 to the function information acquiring unit 42. In step S321, the function information acquiring unit 42 saves the function information acquired from the printer 12 in the function information storage 428. In step S322, the saved function information is sent from the function information acquiring unit 42 to the UI 40. In step S323, the UI 40 causes the display unit 402 to display the updated function setup screen based on this function information. When the updated function setup screen is displayed, and the user presses an "apply" button or an "OK" button (see FIG. 14B), which is displayed outside the tab of the function setup screen but inside the same printer setup screen, in step S324, the UI 40 saves the function information in the setup storage 406.

Figure 12:
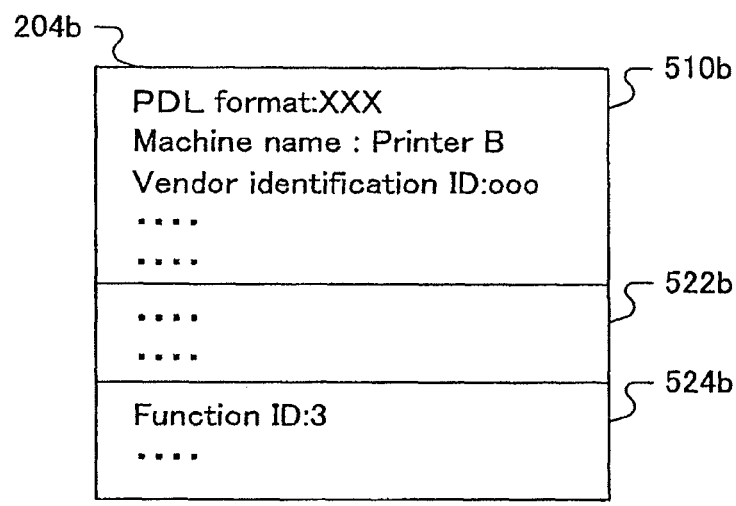
FIG. 12 illustrates configuration information stored in the MIB of the printer according to the second embodiment of the present invention.

FIG. 12 illustrates configuration information stored in the MIB 204 of the printer 12 according to the second embodiment. As shown in FIG. 12, an MIB 204b according to the second embodiment includes a PDL description format, a machine name, and a vendor identification ID in a common region 510b and a function ID in a machine-type dedicated region 524b.

As for the printer 12 to be presently used in the second embodiment, the PDL description format is "XXX", the machine name of the printer 12 is "PrinterB", the vendor identification ID is "ooo", the printer 12 is a product of the same vendor as the printer driver 104, and a function having a function ID "3" can be executed.

Figure 13:
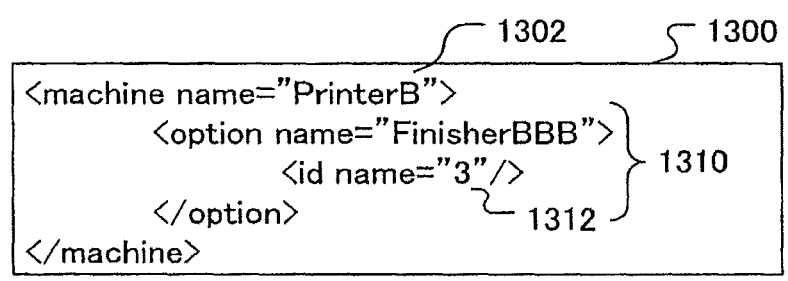
FIG. 13 illustrates an example of a description of the function file according to the second embodiment of the present invention.

FIG. 13 illustrates an example of a description of the function file according to the second embodiment. As shown in FIG. 13, in a function file 1300, there are described a machine name 1302 of the printer corresponding to the function file 1300 and a function 1310 that can be used by the printer. The function 1310 is given a function ID 1312.

In the second embodiment, "PrinterB" is described as the machine name 1302. For the function 1310, the function name (option name) is described as "Finisher BBB" and the function ID 1312 is described as "3".

Figure 11:
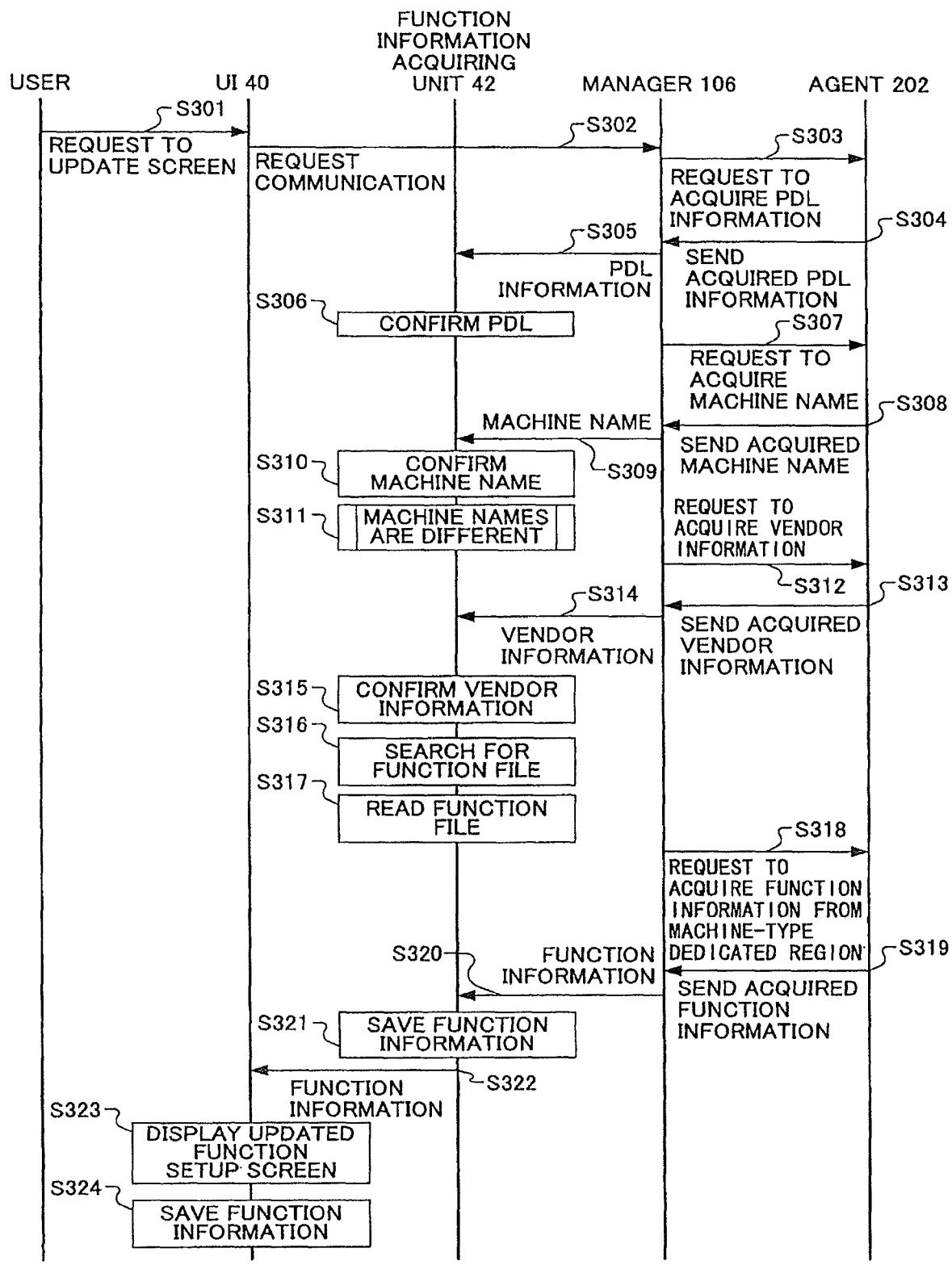
FIG. 11 is a sequence diagram of an operation performed by a printer driver for classifying a printer according to a second embodiment of the present invention.

In the following, the operation described with reference to FIG. 11 is described in further detail, assuming that the printer 12 has the configuration information shown in FIG. 12 (MIB 204b), the printer driver 104 has read beforehand the function file 900 shown in FIG. 9, and the printer driver 104 reads the function file 1300 shown in FIG. 13 found in the function file storage 422, to overwrite the function file 900 read beforehand.

When the manager 106 sends a request to the agent 202 of the printer 12 to acquire the machine name (step S307), the agent 202 acquires the machine name="PrinterB" from the common region 510b of the MIB 204b, and sends it to the manager 106 (step S308). The manager 106 sends this machine name to the function information acquiring unit 42 (step S309). In the function information acquiring unit 42, the device classifying unit 424 compares the machine name="PrinterB" acquired from the printer 12 with the machine name 902 described in the function file 900 read beforehand (step S310), and determines that the printer 12 does not correspond to the function file 900 (step S311).

The function information acquiring unit 42 causes the manager 106 to send a request to the agent 202 of the printer 12 via the network 16, to acquire vendor information (step S312). In response to the acquisition request from the manager 106, the agent 202 acquires the vendor identification ID="ooo" from the common region 510b of the MIB 204b, and sends it to the manager 106 (step S313). The manager 106 sends the vendor information ID to the function information acquiring unit 42 (step S314). In the function information acquiring unit 42, the device classifying unit 424 confirms whether the printer 12 is a product of the same vendor as that of the printer driver 104, based on the vendor identification ID="ooo" acquired from the printer 12 (step S315). If it is confirmed that the printer 12 is a product of the same vendor as that of the printer driver 104, in the function information acquiring unit 42, the function file reading unit 426 will search the function file storage 422 for the function file 1300 describing the same machine name as the machine name="PrinterB" acquired from the printer 12 (step S316). The function file reading unit 426 reads the function file 1300 found as a result of the search, thus overwriting the function file 900 previously read (step S317).

The function information acquiring unit 42 causes the manager 106 to send a request to the agent 202 of the printer 12 via the network 16, to acquire function information pertaining to the function 1310 described in the function file 1300, from the machine-type dedicated region 524b of the MIB 204b (step S318). In response to the acquisition request from the manager 106, the agent 202 acquires function information pertaining to the function with the function ID="3" corresponding to the function 1310 from the machine-type dedicated region 524b, and sends the acquired function information to the manager 106 (step S319). This function information is sent from the manager 106 to the function information acquiring unit 42 (step S320), and saved in the function information storage 428 (step S321).

Figure 14A:
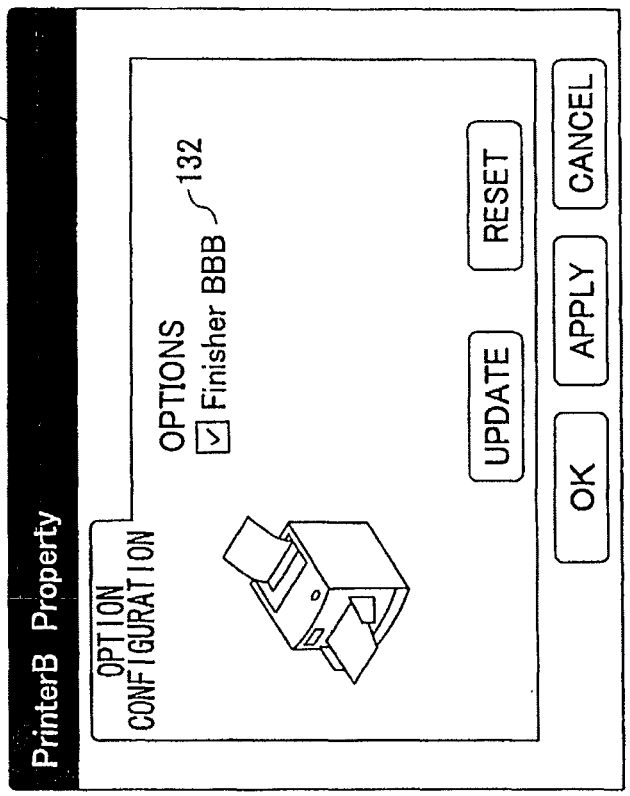
FIGS. 14A and 14B illustrate examples of the function setup screen (option configuration screen) according to the second embodiment of the present invention.
Figure 14B:
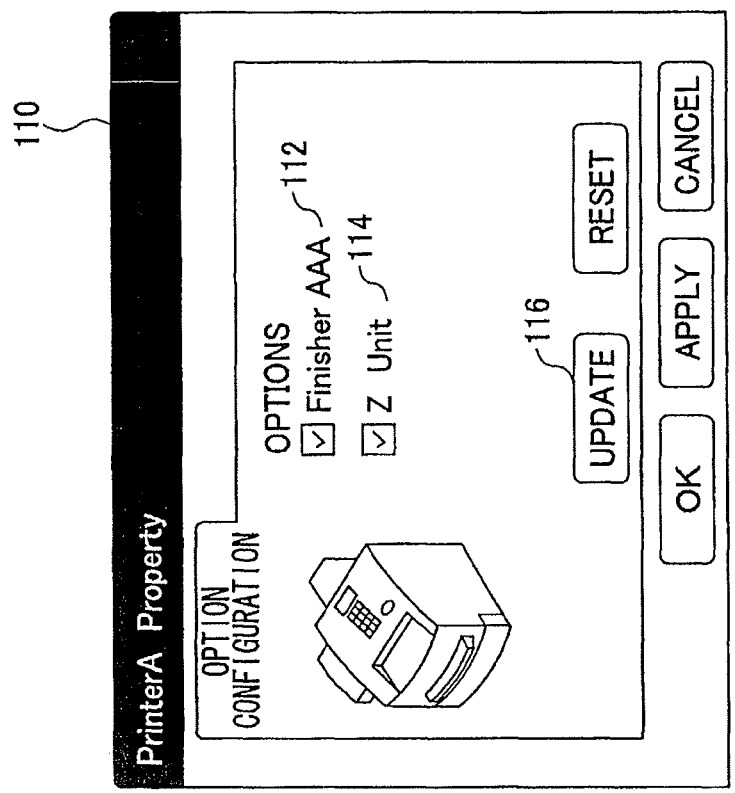

FIGS. 14A and 14B illustrate examples of the function setup screen (option configuration screen) according to the second embodiment. FIG. 14A illustrates a screen based on the previous function information; FIG. 14B illustrates an updated screen that is updated based on the function information acquired from the printer to be presently used, which is displayed after the "update" button has been pressed in the screen shown in FIG. 14A.

The function setup screen 110 before being updated displays function names of all functions (options) 112, 114 of the printer previously used, i.e., "Finisher AAA" and "Z Unit", and also displays check boxes indicating whether the corresponding functions have actually been able to be used by the printer. If the previously used printer has been capable of actually using all of the functions of its machine type, both of the check boxes will be checked (in an on status). Furthermore, the function setup screen 110 includes the "update" button 116, and when a user presses the "update" button 116, the operation shown in FIG. 11 is performed.

An updated function setup screen 130 is for specifying functions of the printer to be presently used. If the printer to be presently used is a product of the same vendor as the printer driver 104 and is a known printer of a different machine type from the previously used printer, the function setup screen 130 will display the function name of a function (option) 132 of the machine type of the printer to be presently used, i.e., "Finisher BBB", and will also display a check box indicating whether the corresponding function can actually be used by the printer to be presently used.

As shown in FIGS. 14A and 14B, in a case where the printer to be presently used is a product of the same vendor as that of the printer driver 104 and is a known printer of a different machine type from the previously used printer, when the screen is updated, not only the on/off statuses of the check boxes change, but the displayed function names also change.

As described above, in the second embodiment, a computer confirms that a printer to be presently used is a known printer of a different machine type from a printer previously connected to the same communication port. In this case, the computer reads a file describing all of the functions that can be executed by a printer of this machine type (of the printer to be presently used). Among all of the functions that can be executed by a printer of this machine type, the computer confirms which function can actually be executed by the printer to be presently used. The computer acquires, from the printer to be presently used, information pertaining to the function that can actually be used by the printer to be presently used. The computer can reflect information as to whether a function can actually be used/cannot be used by the present printer, in a setup screen for the printer.

In a conventional computer, a dedicated printer driver and a dedicated communication port need to be provided for each printer. Thus, a printer to be connected needs to be connected to the dedicated printer driver and the dedicated communication port. However, the computer according to the second embodiment reads a file describing all functions executable by a printer of a particular machine type. Therefore, it is possible to connect another printer of a different machine type from the previous printer, to the same communication port to which the previous printer has been connected, and appropriately specify the functions of the other printer.

Third Embodiment

In a third embodiment, the printer 12 that is connected is unknown to the printer driver 104 (the printer driver 104 does not have a function file corresponding to the printer 12), but is a product of the same vendor as the printer driver 104. An operation of the computer 10 for this case is described with reference to the sequence diagram shown in FIG. 15.

First, in step S401, a user makes a request to update the function setup screen, using the input unit 404 of the UI 40. Specifically, the user presses an "update" button (see FIG. 18A) in the function setup screen displayed by the display unit 402 of the UI 40. In response to the request from the user, in step S402, the UI 40 specifies a port name and requests the manager 106 to perform bidirectional communication with the printer 12 of the specified port name.

In response to the request from the UI 40, in step S403, the manager 106 sends a request to the agent 202 of the printer 12 via the network 16, to acquire PDL information pertaining to the description format of PDL. In step S404, the agent 202 acquires PDL information from the common region 510 of the MIB 204, and sends the acquired PDL information to the manager 106. In step S405, the manager 106 sends the PDL information acquired from the printer 12 to the function information acquiring unit 42. In step S406, in the function information acquiring unit 42, the device classifying unit 424 confirms whether the PDL description format of the printer 12 corresponds to the printer driver 104, based on the PDL information acquired from the printer 12.

If the PDL description format of the printer 12 corresponds to the printer driver 104, in step S407, the function information acquiring unit 42 will cause the manager 106 to send a request to the agent 202 of the printer 12 via the network 16, to acquire the machine name. In step S408, the agent 202 acquires the machine name from the common region 510 of the MIB 204, and sends it to the manager 106. In step S409, the manager 106 sends the machine name acquired from the printer 12 to the function information acquiring unit 42. In step S410, in the function information acquiring unit 42, the device classifying unit 424 confirms whether the machine name described in the function file read beforehand (in step S105 in FIG. 6) is the same as the machine name acquired from the printer 12.

In the third embodiment, in step S411, the device classifying unit 424 determines that the machine name described in the function file read beforehand and the machine name acquired from the printer 12 are different. In this case, in step S412, the function information acquiring unit 42 causes the manager 106 to send a request to the agent 202 of the printer 12 via the network 16, to acquire vendor information. In step S413, the agent 202 acquires the vendor information from the common region 510 of the MIB 204, and sends it to the manager 106. In step S414, the manager 106 sends the vendor information acquired from the printer 12 to the function information acquiring unit 42. In step S415, in the function information acquiring unit 42, the device classifying unit 424 confirms whether the vendor of the printer 12 is the same as that of the printer driver 104, based on the vendor information acquired from the printer 12.

If the printer 12 is a product of the same vendor as that of the printer driver 104, in step S416, in the function information acquiring unit 42, the function file reading unit 426 will search the function file storage 422 for a function file corresponding to the printer 12, based on the machine name acquired from the printer 12. In the third embodiment, in step S417, as a result of the search, the function file reading unit 426 cannot find a function file corresponding to the printer 12 in the function file storage 422. Therefore, in step S418, the function file reading unit 426 reads, from the function file storage 422, a function file common to printers of the same vendor regardless of the machine type, thus overwriting the function file previously read.

Next, in step S419, the function information acquiring unit 42 causes the manager 106 to send a request to the agent 202 of the printer 12 via the network 16, to acquire function information pertaining to the function described in the function file read in step S418, from the machine-type common region 522 of the MIB 204. In step S420, the agent 202 acquires function information pertaining to a function common to printers of the common vendor, from the machine-type common region 522 of the MIB 204, and sends the acquired function information to the manager 106. In step S421, the manager 106 sends the function information acquired from the printer 12 to the function information acquiring unit 42. In step S422, the function information acquiring unit 42 saves the function information acquired from the printer 12 in the function information storage 428.

Next, in step S423, the function information acquiring unit 42 causes the manager 106 to send a request to the agent 202 of the printer 12 via the network 16, to acquire function information pertaining to the function described in the function file read in step S418, from the machine-type common region 510 of the MIB 204. In step S424, the agent 202 acquires function information pertaining to the function common to all printers from the common region 510 of the MIB 204, and sends the acquired function information to the manager 106. In step S425, the manager 106 sends the function information acquired from the printer 12 to the function information acquiring unit 42. In step S426, the function information acquiring unit 42 saves the function information acquired from the printer 12 in the function information storage 428.

In step S427, the function information saved in the function information storage 428 in steps S422 and S426 is sent from the function information acquiring unit 42 to the UI 40. In step S428, the UI 40 causes the display unit 402 to display the updated function setup screen based on this function information. When the updated function setup screen is displayed, and the user presses an "apply" button or an "OK" button (see FIG. 18B), which is displayed outside the tab of the function setup screen but inside the same printer setup screen, in step S429, the UI 40 saves the function information in the setup storage 406.

Figure 16:
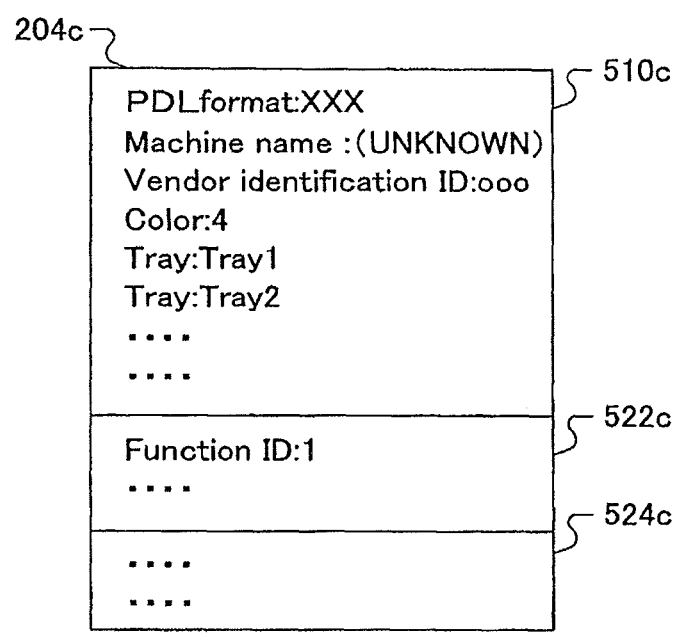
FIG. 16 illustrates configuration information stored in the MIB of the printer according to the third embodiment of the present invention.

FIG. 16 illustrates configuration information stored in the MIB 204 of the printer 12 according to the third embodiment. As shown in FIG. 16, an MIB 204c according to the third embodiment includes a PDL description format, a machine name, a vendor identification ID, color information indicating the number of colors used for printing, and tray information regarding trays for holding printing sheets in a common region 510c, and a function ID in a machine-type common region 522c.

As for the printer 12 to be presently used in the third embodiment, the PDL description format is "XXX", the machine name of the printer 12 is unknown (to the printer driver 104), the vendor identification ID is "ooo", the printer 12 is a product of the same vendor as the printer driver 104, the color information is "4", indicating four-color printing, the first and second tray information items are "Tray1" and "Tray2", respectively, and a function having a function ID "1" can be executed.

FIG. 17 illustrates an example of a description of the function file according to the third embodiment. As shown in FIG. 17, in a function file 1700, there are described a machine name 1702 of the printer corresponding to the function file 1700, and functions 1710, 1720, and 1750 that can be used by the printer.

The machine name 1702 does not indicate a specific machine name, but indicates that the printer is a product of the same vendor as the printer driver 104. For example, in the third embodiment, the machine name 1702 indicates "Printer made by ooo".

The first function 1710 is given a function ID 1712. In the third embodiment, the first function information 1710 pertains to a function executed by printers of a common vendor regardless of the machine type. The function ID 1712 is "1".

The second function 1720 includes a first sub-function 1730 and a second sub-function 1740. The first and second sub-functions 1730 and 1740 are given function IDs 1732 and 1742, respectively. In the third embodiment, the second function 1720 has a function name (option name) "Color", indicating whether color printing is possible. In this case, the first sub-function 1730 is a color printing function, and its function ID 1732 is "4", indicating the number of colors. Meanwhile, the second sub-function 1740 is a monochrome printing function, and its function ID 1742 is "1", indicating the number of colors.

In the third embodiment, the third function 1750 is described in the function file 1700 for acquiring tray information from the printer.

Figure 15:
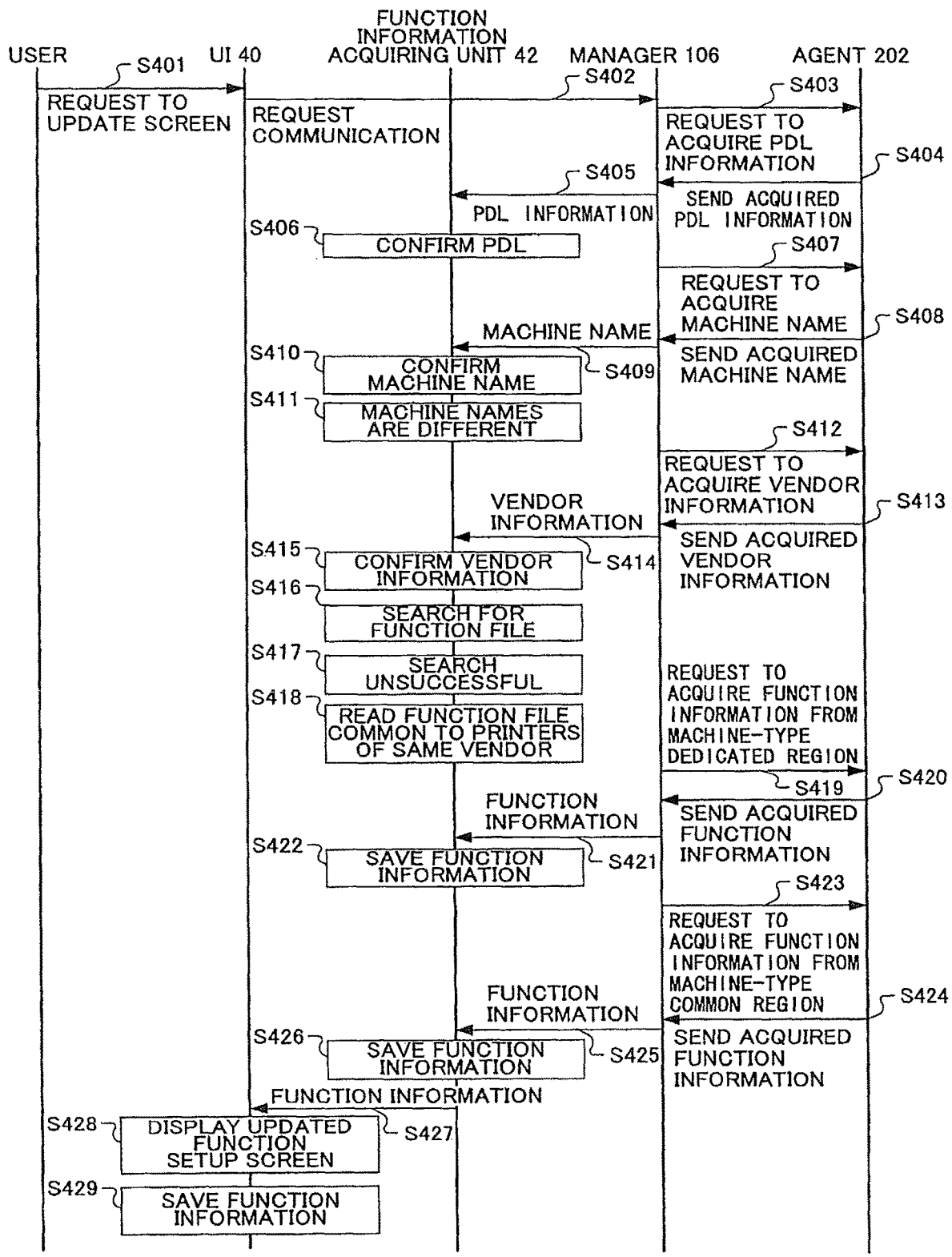
FIG. 15 is a sequence diagram of an operation performed by a printer driver for classifying a printer according to a third embodiment of the present invention.

In the following, the operation described with reference to FIG. 15 is described in further detail, assuming that the printer 12 has the configuration information shown in FIG. 16 (MIB 204c), the printer driver 104 has read beforehand the function file 900 shown in FIG. 9, and the printer driver 104 reads the function file 1700 shown in FIG. 17 found in the function file storage 422, to overwrite the function file 900 read beforehand.

When the manager 106 sends a request to the agent 202 of the printer 12 to acquire the machine name (step S407), the agent 202 acquires the machine name="(unknown)" from the common region 510c of the MIB 204c, and sends it to the manager 106 (step S408). The manager 106 sends this machine name to the function information acquiring unit 42 (step S409). In the function information acquiring unit 42, the device classifying unit 424 compares the machine name="(unknown)" acquired from the printer 12 with the machine name 902 described in the function file 900 read beforehand (step S410), and determines that the printer 12 does not correspond to the function file 900 (step S411).

The function information acquiring unit 42 causes the manager 106 to send a request to the agent 202 of the printer 12 via the network 16, to acquire vendor information (step S412). In response to the acquisition request from the manager 106, the agent 202 acquires the vendor identification ID="ooo" from the common region 510c of the MIB 204c, and sends it to the manager 106 (step S413). The manager 106 sends the vendor information ID to the function information acquiring unit 42 (step S414). In the function information acquiring unit 42, the device classifying unit 424 confirms whether the printer 12 is a product of the same vendor as that of the printer driver 104, based on the vendor identification ID="ooo" acquired from the printer 12 (step S415). If it is confirmed that the printer 12 is a product of the same vendor as that of the printer driver 104, in the function information acquiring unit 42, the function file reading unit 426 will search the function file storage 422 for a function file describing the same machine name as the machine name="(unknown)" acquired from the printer 12 (step S416). When a function file describing the same machine name as the machine name="(unknown)" acquired from the printer 12 cannot be found (step S417), the function file reading unit 426 reads the function file 1700 common to printers of the same vendor regardless of the machine type from the function file storage 422, thus overwriting the function file 900 previously read (step S418).

The function information acquiring unit 42 causes the manager 106 to send a request to the agent 202 of the printer 12 via the network 16, to acquire function information pertaining to the function 1710 described in the function file 1700, from the machine-type common region 522c of the MIB 204c (step S419). In response to the acquisition request from the manager 106, the agent 202 acquires function information pertaining to the function with the function ID corresponding to the function 1710 from the machine-type common region 522c. In the third embodiment, the machine-type common region 522c includes the function ID="1" corresponding to the first function 1710. Hence, the agent 202 acquires function information pertaining to the function having the function ID="1" from the machine-type common region 522c, and sends the acquired function information to the manager 106 (step S420). The function information is sent from the manager 106 to the function information acquiring unit 42 (step S421), and is saved in the function information storage 428 (step S422).

The function information acquiring unit 42 causes the manager 106 to send a request to the agent 202 of the printer 12 via the network 16, to acquire function information pertaining to the functions 1720 and 1750 described in the function file 1700, from the common region 510c of the MIB 204c (step S423). In response to the acquisition request from the manager 106, the agent 202 acquires function information corresponding to the functions 1720 and 1750 from the common region 510c. In the third embodiment, the common region 510c includes color information "Color: 4" indicating that the number of colors is four, and therefore, the agent 202 acquires the color information "4" as function information corresponding to the function 1720 from the common region 510c, and sends the acquired function information to the manager 106. Furthermore, in the third embodiment, the common region 510c includes tray information "Tray: Tray1" and "Tray: Tray2", and therefore, the agent 202 acquires "Tray1" and "Tray2" as tray information corresponding to the function 1750 from the common region 510c, and sends the acquired tray information to the manager 106 (step S424). In reality, the color information and the tray information are given different identifiers (OID) in the MIB 204c, and are thus acquired at different timings. The function information is sent from the manager 106 to the function information acquiring unit 42 (step S425), and is saved in the function information storage 428 (step S426).

Accordingly, the function information storage 428 holds the function information pertaining to functions executed by printers of the common vendor regardless of the machine type, function information pertaining to the color printing function, and the tray information acquired from the printer 12.

Figure 18A:
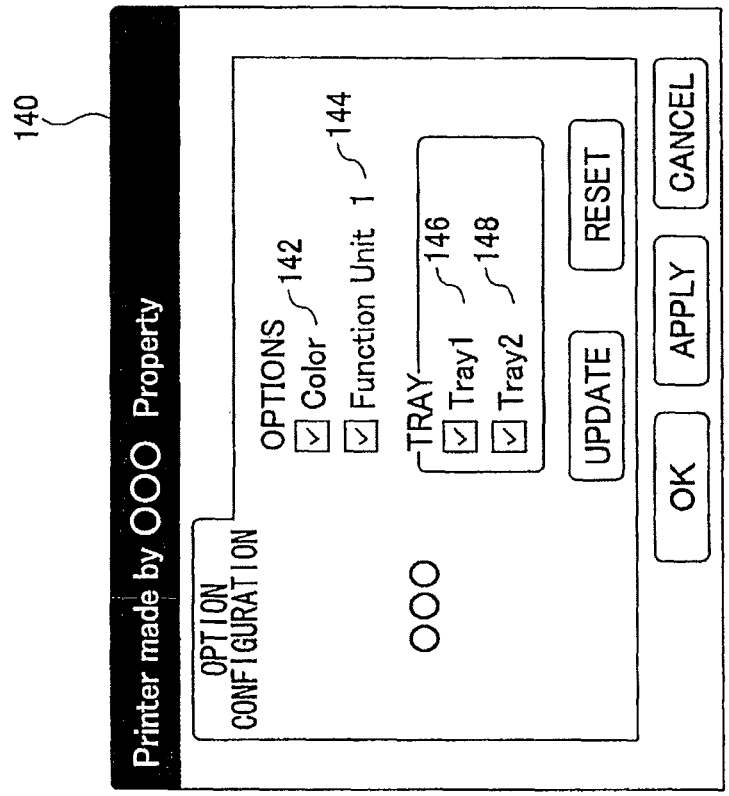
FIGS. 18A and 18B illustrate examples of the function setup screen (option configuration screen) according to the third embodiment of the present invention.
Figure 18B:
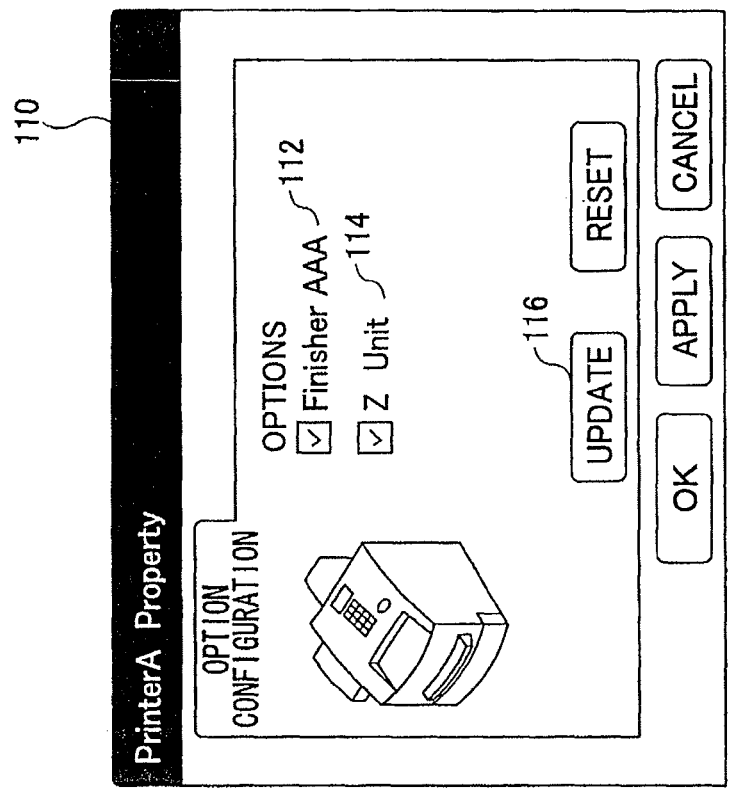

FIGS. 18A and 18B illustrate examples of the function setup screen (option configuration screen) according to the third embodiment. FIG. 18A illustrates a screen based on the previous function information; FIG. 18B illustrates an updated screen that is updated based on the function information acquired from the printer to be presently used, which is displayed after the "update" button has been pressed in the screen shown in FIG. 18A.

The function setup screen 110 before being updated displays function names of all functions (options) 112, 114 of the printer previously used, i.e., "Finisher AAA" and "Z Unit", and also displays check boxes indicating whether the corresponding functions have actually been able to be used by the printer. If the previously used printer has been capable of actually using all of the functions of its machine type, both of the check boxes will be checked (in an on status). Furthermore, the function setup screen 110 includes the "update" button 116, and when a user presses the "update" button 116, the operation shown in FIG. 15 is performed.

An updated function setup screen 140 is for specifying functions of the printer to be presently used. If the printer to be presently used is a product of the same vendor as the printer driver 104, is a printer of a different machine type from the previously used printer, and is unknown to the printer driver 104, the function setup screen 140 will display the following. That is, the function setup screen 140 will display the function names of functions (options) 142, 144, 146, and 148 common to printers of the same vendor, regardless of the machine type, i.e., "Color", "Function Unit 1", "Tray1", and "Tray2", and will also display check boxes indicating whether the corresponding functions can actually be used by the printer to be presently used.

As shown in FIGS. 18A and 18B, in a case where the printer to be presently used is a product of the same vendor as that of the printer driver 104, is a printer of a different machine type from the previously used printer, and is unknown to the printer driver 104, when the screen is updated, not only the on/off statuses of the check boxes change, but the displayed function names also change.

As described above, in the third embodiment, a computer confirms that a printer to be presently used is a printer of a different machine type from a printer previously connected to the same communication port, is of a machine type unknown to the printer driver 104, and is a product of the same vendor as that of the printer driver 104. In this case, the computer reads a file describing all of the functions that can be executed by all printers of the same vendor. Among all of the functions that can be executed by printers of the same vendor, the computer confirms which function can actually be executed by the printer to be presently used. The computer acquires, from the printer to be presently used, information pertaining to the function that can actually be used by the printer to be presently used. The computer can reflect information as to whether a function can actually be used/cannot be used by the present printer, in a setup screen for the printer.

In a conventional computer, a dedicated printer driver and a dedicated communication port need to be provided for each printer. Thus, even if the printer that is presently connected is a product of the same vendor as that of the printer driver, the printer may not be able to be used. However, the computer according to the third embodiment reads a file describing all functions executable by all printers of a particular vendor. Therefore, it is possible to connect a different printer from a previous printer, which different printer is of the same vendor as that of the printer driver, to the same communication port to which the previous printer has been connected, and appropriately specify the functions of the different printer.

Fourth Embodiment

In a fourth embodiment, the printer 12 that is connected is unknown to the printer driver 104 (the printer driver 104 does not have a function file corresponding to the printer 12), and is a product of a different vendor from that of the printer driver 104. An operation of the computer 10 for this case is described with reference to the sequence diagram shown in FIG. 19.

First, in step S501, a user makes a request to update the function setup screen, using the input unit 404 of the UI 40. Specifically, the user presses an "update" button (see FIG. 22A) in the function setup screen displayed by the display unit 402 of the UI 40. In response to the request from the user, in step S502, the UI 40 specifies a port name and requests the manager 106 to perform bidirectional communication with the printer 12 of the specified port name.

In response to the request from the UI 40, in step S503, the manager 106 sends a request to the agent 202 of the printer 12 via the network 16, to acquire PDL information pertaining to the description format of PDL. In step S504, the agent 202 acquires PDL information from the common region 510 of the MIB 204, and sends the acquired PDL information to the manager 106. In step S505, the manager 106 sends the PDL information acquired from the printer 12 to the function information acquiring unit 42. In step S506, in the function information acquiring unit 42, the device classifying unit 424 confirms whether the PDL description format of the printer 12 corresponds to the printer driver 104, based on the PDL information acquired from the printer 12.

If the PDL description format of the printer 12 corresponds to the printer driver 104, in step S507, the function information acquiring unit 42 will cause the manager 106 to send a request to the agent 202 of the printer 12 via the network 16, to acquire the machine name. In step S508, the agent 202 acquires the machine name from the common region 510 of the MIB 204, and sends it to the manager 106. In step S509, the manager 106 sends the machine name acquired from the printer 12 to the function information acquiring unit 42. In step S510, in the function information acquiring unit 42, the device classifying unit 424 confirms whether the machine name described in the function file read beforehand (in step S105 in FIG. 6) is the same as the machine name acquired from the printer 12.

In the fourth embodiment, in step S511, the device classifying unit 424 determines that the machine name described in the function file read beforehand and the machine name acquired from the printer 12 are different. In this case, in step S512, the function information acquiring unit 42 causes the manager 106 to send a request to the agent 202 of the printer 12 via the network 16, to acquire vendor information. In step S513, the agent 202 acquires the vendor information from the common region 510 of the MIB 204, and sends it to the manager 106. In step S514, the manager 106 sends the vendor information acquired from the printer 12 to the function information acquiring unit 42. In step S515, in the function information acquiring unit 42, the device classifying unit 424 confirms whether the vendor of the printer 12 is the same as that of the printer driver 104, based on the vendor information acquired from the printer 12.

In the fourth embodiment, in step S516, the device classifying unit 424 determines that the vendor of the printer 12 and the vendor of the printer driver 104 are different. In this case, in step S517, the function file reading unit 426 reads, from the function file storage 422, a function file common to all printers, regardless of the machine type or the vendor, thus overwriting the function file previously read.

Next, in step S518, the function information acquiring unit 42 causes the manager 106 to send a request to the agent 202 of the printer 12 via the network 16, to acquire function information pertaining to the function described in the function file read in step S517, from the common region 510 of the MIB 204. In step S519, the agent 202 acquires function information pertaining to a function common to all printers, from the common region 510 of the MIB 204, and sends the acquired function information to the manager 106. In step S520, the manager 106 sends the function information acquired from the printer 12 to the function information acquiring unit 42. In step S521, the function information acquiring unit 42 saves the function information acquired from the printer 12 in the function information storage 428. In step S522, the function information saved in the function information storage 428 is sent from the function information acquiring unit 42 to the UI 40. In step S523, the UI 40 causes the display unit 402 to display the updated function setup screen based on this function information. When the updated function setup screen is displayed, and the user presses an "apply" button or an "OK" button (see FIG. 22B), which is displayed outside the tab of the function setup screen but inside the same printer setup screen, in step S524, the UI 40 saves the function information in the setup storage 406.

Figure 20:
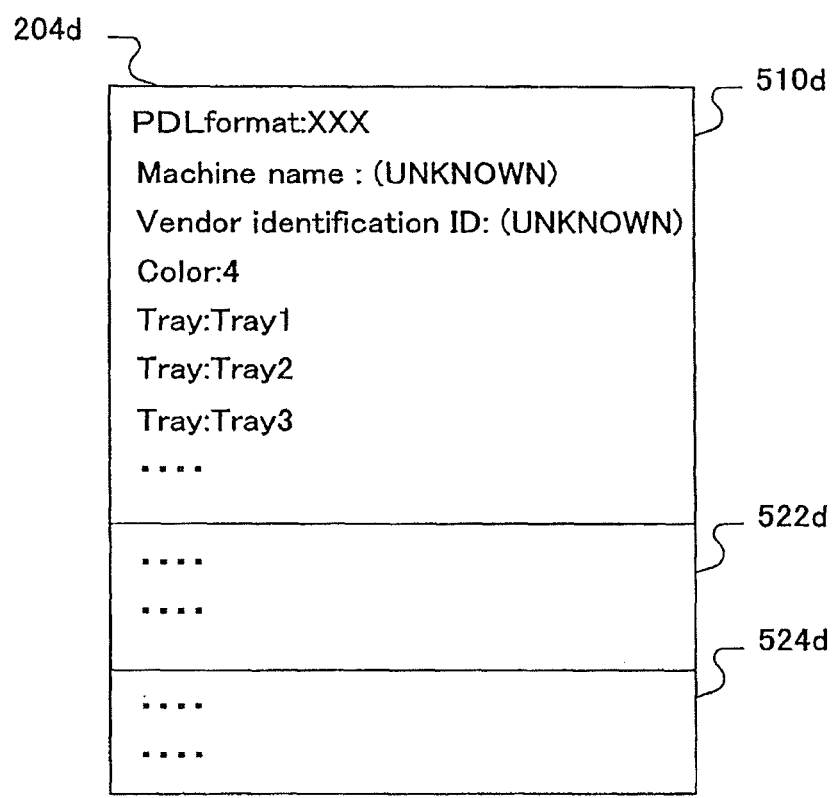
FIG. 20 illustrates configuration information stored in the MIB of the printer according to the fourth embodiment of the present invention.

FIG. 20 illustrates configuration information stored in the MIB 204 of the printer 12 according to the fourth embodiment. As shown in FIG. 20, an MIB 204d according to the fourth embodiment includes a PDL description format, a machine name, a vendor identification ID, color information indicating the number of colors used for printing, and tray information regarding trays for holding printing sheets in a common region 510d.

As to the printer 12 to be presently used in the fourth embodiment, the PDL description format is "XXX", the machine name and the vendor identification ID of the printer 12 are unknown (to the printer driver 104), the color information is "4", indicating four-color printing, and the first, second, and third tray information items are "Tray1", "Tray2", and "Tray2", respectively.

FIG. 21 illustrates an example of a description of the function file according to the fourth embodiment. As shown in FIG. 21, in a function file 2100, there are described a machine name 2102 of the printer corresponding to the function file 2100, and functions 2110 and 2140 that can be used by the printer.

The machine name 2102 does not indicate a specific machine name, but indicates that the printer is a product of a different vendor from that of the printer driver 104. For example, in the fourth embodiment, the machine name 2102 indicates "OtherPrinter".

The first function 2110 includes a first sub-function 2120 and a second sub-function 2130. The first and second sub-functions 2120 and 2130 are given function IDs 2122 and 2132, respectively. In the fourth embodiment, the first function 2110 has a function name (option name) "Color", indicating whether color printing is possible. In this case, the first sub-function 2120 is a color printing function, and its function ID 2122 is "4", indicating the number of colors. Meanwhile, the second sub-function 2130 is a monochrome printing function, and its function ID 2132 is "1", indicating the number of colors.

In the fourth embodiment, the second function 2140 is described in the function file 1700 for acquiring tray information from the printer.

In the following, the operation described with reference to FIG. 19 is described in further detail, assuming that the printer 12 has the configuration information shown in FIG. 20 (MIB 204d), the printer driver 104 has read beforehand the function file 900 shown in FIG. 9, and the printer driver 104 reads the function file 2100 shown in FIG. 21 found in the function file storage 422, to overwrite the function file 900 read beforehand.

When the manager 106 sends a request to the agent 202 of the printer 12 to acquire the machine name (step S507), the agent 202 acquires the machine name="(unknown)" from the common region 510d of the MIB 204d, and sends it to the manager 106 (step S508). The manager 106 sends this machine name to the function information acquiring unit 42 (step S509). In the function information acquiring unit 42, the device classifying unit 424 compares the machine name="(unknown)" acquired from the printer 12 with the machine name 902 described in the function file 900 read beforehand (step S510), and determines that the printer 12 does not correspond to the function file 900 (step S511).

The function information acquiring unit 42 causes the manager 106 to send a request to the agent 202 of the printer 12 via the network 16, to acquire vendor information (step S512). In response to the acquisition request from the manager 106, the agent 202 acquires the vendor identification ID="(unknown)" from the common region 510d of the MIB 204d, and sends it to the manager 106 (step S513). The manager 106 sends the vendor information ID to the function information acquiring unit 42 (step S514). In the function information acquiring unit 42, the device classifying unit 424 confirms whether the printer 12 is a product of the same vendor as that of the printer driver 104, based on the vendor identification ID="(unknown)" acquired from the printer 12 (step S515). If it is confirmed that the printer 12 is a product of a different vendor from that of the printer driver 104 (step S516), in the function information acquiring unit 42, the function file reading unit 426 will read the function file 2100 common to all printers regardless of the machine type or the vendor from the function file storage 422, thus overwriting the function file 900 previously read (step S517).

The function information acquiring unit 42 causes the manager 106 to send a request to the agent 202 of the printer 12 via the network 16, to acquire function information pertaining to the functions 2110 and 2140 described in the function file 2100, from the common region 510d of the MIB 204d (step S518). In response to the acquisition request from the manager 106, the agent 202 acquires function information corresponding to the functions 2110 and 2140 from the common region 510d. In the fourth embodiment, the common region 510d includes color information "Color: 4" indicating that the number of colors is four, and therefore, the agent 202 acquires the color information "4" as function information corresponding to the function 2110 from the common region 510d, and sends the acquired function information to the manager 106. Furthermore, in the fourth embodiment, the common region 510d includes tray information "Tray: Tray1", "Tray: Tray2", and "Tray: Tray3", and therefore, the agent 202 acquires "Tray1", "Tray2", and "Tray3" as tray information corresponding to the function 2140 from the common region 510d, and sends the acquired tray information to the manager 106 (step S519). In reality, the color information and the tray information are given different identifiers (OID) in the MIB, and are thus acquired at different timings. The function information is sent from the manager 106 to the function information acquiring unit 42 (step S520), and is saved in the function information storage 428 (step S521).

Accordingly, the function information storage 428 holds the function information pertaining to the color printing function, and the tray information acquired from the printer 12.

Figure 22A:
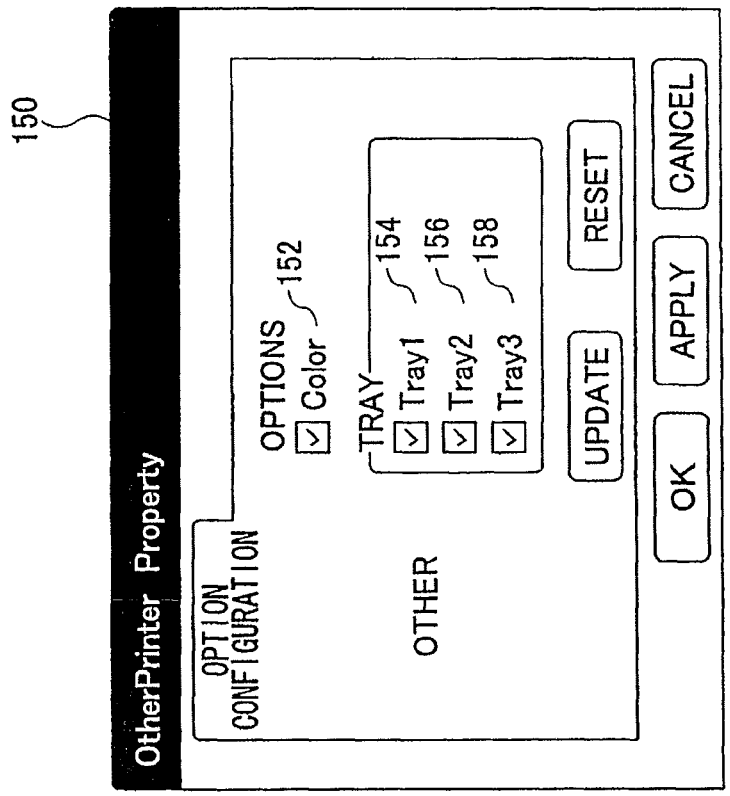
FIGS. 22A and 22B illustrate examples of the function setup screen (option configuration screen) according to the fourth embodiment of the present invention.
Figure 22B:
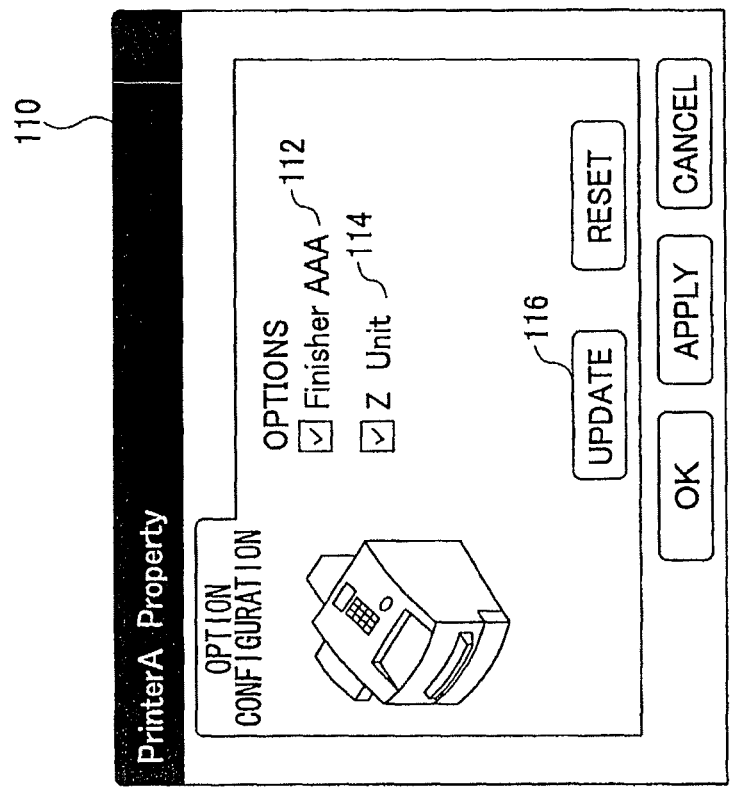

FIGS. 22A and 22B illustrate examples of the function setup screen (option configuration screen) according to the fourth embodiment. FIG. 22A illustrates a screen based on the previous function information; FIG. 22B illustrates an updated screen that is updated based on the function information acquired from the printer to be presently used, which is displayed after the "update" button has been pressed in the screen shown in FIG. 22A.

The function setup screen 110 before being updated displays function names of all functions (options) 112, 114 of the printer previously used, i.e., "Finisher AAA" and "Z Unit", and also displays check boxes indicating whether the corresponding functions have actually been able to be used by the printer. If the previously used printer has been capable of actually using all of the functions of its machine type, both of the check boxes will be checked (in an on status). Furthermore, the function setup screen 110 includes the "update" button 116, and when a user presses the "update" button 116, the operation shown in FIG. 19 is performed.

An updated function setup screen 150 is for specifying functions of the printer to be presently used. If the printer to be presently used is a product of a different vendor from the printer driver 104, the function setup screen 150 will display the following. That is, the function setup screen 150 will display the function names of functions (options) 152, 154, 156, and 158 common to all printers, regardless of the machine type or the vendor, i.e., "Color", "Tray1", "Tray2", and "Tray3", and will also display check boxes indicating whether the corresponding functions can actually be used by the printer to be presently used.

As shown in FIGS. 22A and 22B, in a case where the printer to be presently used is of a different machine type from the previously used printer and is a product of a different vendor from that of the printer driver 104, when the screen is updated, not only the on/off statuses of the check boxes change, but the displayed function names also change.

As described above, in the fourth embodiment, a computer confirms that a printer to be presently used is a printer of a different machine type from a printer previously connected to the same communication port, is of a machine type unknown to the printer driver 104, and is a product of a different vendor from that of the printer driver 104. In this case, the computer reads a file describing all of the functions that can be executed by all of the printers, regardless of the machine type or the vendor. Among all of the functions that can be executed by all of the printers, the computer confirms which function can actually be executed by the printer to be presently used. The computer acquires, from the printer to be presently used, information pertaining to the function that can actually be used by the printer to be presently used. The computer can reflect information as to whether a function can actually be used/cannot be used by the present printer, in a setup screen for the printer.

In a conventional computer, a dedicated printer driver and a dedicated communication port need to be provided for each printer. Thus, if a dedicated printer driver and a dedicated communication port are not provided for a printer connected to the computer, or if such a dedicated printer driver and a dedicated communication port are provided for the printer, but this printer is connected to another printer driver and another communication port, the computer will determine that the printer is unknown, and therefore, the printer cannot be used. However, the computer according to the fourth embodiment reads a file describing all functions executable by any printer. Accordingly, even if a connected printer is determined as an unknown printer, it is possible to appropriately specify the functions of this printer.

Fifth Embodiment

In a fifth embodiment, the PDL description format of the printer 12 that is connected does not correspond to the printer driver 104. An operation of the computer 10 for this case is described with reference to the sequence diagram shown in FIG. 23.

First, in step S601, a user makes a request to update the function setup screen, using the input unit 404 of the UI 40. Specifically, the user presses an "update" button (see FIG. 10A) in the function setup screen displayed by the display unit 402 of the UI 40. In response to the request from the user, in step S602, the UI 40 specifies a port name and requests the manager 106 to perform bidirectional communication with the printer 12 of the specified port name.

In response to the request from the UI 40, in step S603, the manager 106 sends a request to the agent 202 of the printer 12 via the network 16, to acquire PDL information pertaining to the description format of PDL. In step S604, the agent 202 acquires PDL information from the common region 510 of the MIB 204, and sends the acquired PDL information to the manager 106. In step S605, the manager 106 sends the PDL information acquired from the printer 12 to the function information acquiring unit 42. In step S606, in the function information acquiring unit 42, the device classifying unit 424 confirms whether the PDL description format of the printer 12 corresponds to the printer driver 104, based on the PDL information acquired from the printer 12.

In the fifth embodiment, in step S607, the device classifying unit 424 determines that the PDL description format of the printer 12 does not correspond to the printer driver 104. In this case, in step S608, the function information acquiring unit 42 reports to the UI 40 that the PDL description format is ineligible. Upon receiving this report, in step S609, the UI 40 displays a screen (page) on the display unit 402 indicating that functions of the printer 12 cannot be specified.

As described above, according to the fifth embodiment, a computer can confirm whether the device (e.g., a printer) itself can be used in the first place, before acquiring function information pertaining to functions that can be used by the device.

Modifications

As described above, the embodiments of the present invention describe a printer driver; however, the present invention is applicable to other device drivers such as a scanner driver and a PC-FAX driver, as long as the device driver is software capable of converting an instruction from an application into data processable by a device.

Furthermore, as described above, functions of the present invention can be realized by a program stored in a memory such as a hard disk (HDD) or a read-only memory (ROM) in an information processing apparatus; the functions can also be realized by hardware in an information processing apparatus.

Furthermore, an embodiment of the present invention is not limited to the format of the device driver or a module pursuant to the device driver; an embodiment of the present invention is also applicable to the application itself.

According to one embodiment of the present invention, an information processing apparatus is capable of acquiring, from a device connected to the information processing apparatus, configuration information concerning the device for a setup corresponding to the device according to the configuration information. The information processing apparatus includes a function file storage configured to hold a function file describing a function of the device; a device classifying unit configured to classify the device into a category according to the configuration information acquired from the device; an information acquiring unit configured to acquire, from the device, information concerning the function described in the function file corresponding to the category into which the device is classified by the device classifying unit; and a display unit configured to display a setup page used for the setup corresponding to the device, according to the information acquired by the information acquiring unit.

Thus, an information processing apparatus capable of making full use of functions of a device according to the type of device, can be provided. The information processing apparatus according to an embodiment of the present invention is capable of responding to any type of device. Moreover, the information processing apparatus can select functions to be set up from among the functions that can be used by the device, according to the type of the device.

Preferably, in the information processing apparatus according to an embodiment of the present invention, the function file storage holds a first function file describing a function common to devices of the same machine type; a second function file describing a function common to devices of the same vendor as that of the information processing apparatus, regardless of the machine type of the devices; and a third function file describing a function common to all devices, regardless of the machine type or the vendor of the devices.

Thus, the information processing apparatus is capable of responding not only to devices that have been recognized beforehand but also to any device, and effectively use functions common to all devices without any limitation.

Additionally, preferably, the information processing apparatus according to an embodiment of the present invention further includes a reading unit configured to read, from the function file storage, the function file according to the category into which the device is classified by the device classifying unit. The information acquiring unit acquires the information concerning the function described in the function file read by the reading unit; the device classifying unit classifies the device, according to the configuration information acquired from the device, as a known device, an unknown device of the same vendor, or an unknown device of a different vendor; the reading unit reads the first function file from the function file storage in the event that the device is classified as the known device; the reading unit reads the second function file from the function file storage in the event that the device is classified as the unknown device of the same vendor; and the reading unit reads the third function file from the function file storage in the event that the device is classified as the unknown device of a different vendor.

Thus, the devices can be classified according to whether they are already known to the information processing apparatus. Moreover, the devices classified as unknown devices can be further classified according to whether they are products of a vendor to which the information processing apparatus can respond. The functions of the device that can be used by the information processing apparatus change according to the category into which the device to be presently used is classified.

Additionally, preferably, in the information processing apparatus according to an embodiment of the present invention, the configuration information acquired from the device includes machine type identification information and/or vendor information of the device.

Thus, the information processing apparatus is capable of acquiring, from the device, information pertaining to functions common to a particular machine type and/or information pertaining to functions common to a particular vendor.

Additionally, preferably, in the information processing apparatus according to an embodiment of the present invention, the configuration information acquired from the device further includes operation information concerning an operation of the device; and the device classifying unit is configured to determine, according to the operation information, whether the information processing apparatus is capable of generating data in a format processable by the device. Moreover, the operation information can indicate a description format of data processable by the device.

Thus, it is possible to confirm whether the device itself can be used in the first place, before acquiring information pertaining to functions that can be used by the device.

Additionally, preferably, the information processing apparatus according to an embodiment of the present invention further includes a communication unit in which communication information is specified for enabling connection of the known device, the unknown device of the same vendor, and the unknown device of a different vendor.

Thus, when another device of a different machine type from the previous device is connected to the same communication unit, i.e., communication port, to which the previous device has been connected, it is possible to display a setup screen for the other device without requiring a special process.

Additionally, preferably, in the information processing apparatus according to an embodiment of the present invention, the function file storage is provided outside and/or inside the information processing apparatus.

Thus, the information processing apparatus can read the function file from inside the information processing apparatus or from another apparatus within the same network as the information processing apparatus.

Additionally, preferably, in the information processing apparatus according to an embodiment of the present invention, the function file storage includes a recording medium that is readable by the information processing apparatus.

Thus, the information processing apparatus can read the function file from an external recording medium.

Additionally, an embodiment of the present invention is applicable to a program product for causing a computer to function as the elements of the information processing apparatus, a recording medium storing the program product, a method performed by the information processing apparatus, and an information processing system including the information processing apparatus and devices connected to the information processing apparatus.

The present invention is not limited to the specifically disclosed embodiment, and variations and modifications may be made without departing from the scope of the present invention.

The present application is based on Japanese Priority Patent Application No. 2006-251900, filed on Sep. 15, 2006 and Japanese Priority Patent Application No. 2007-143646, filed on May 30, 2007, the entire contents of which are hereby incorporated by reference.

What is claimed is:

1. A method comprising:
    storing a function file in an information processing apparatus, the function file describing one or more functions included in each of a plurality of devices;
    acquiring, from a printing device connected to the information processing apparatus, configuration information concerning the device, the configuration information being stored in the printing device;
    determining whether or not to acquire, from the printing device, function information corresponding to one or more functions included in the printing device, based on the configuration information acquired from the printing device;
    in the case that the determination is made to acquire the function information, identifying the one or more functions for acquiring from the printing device, the one or more identified functions corresponding to the configuration information acquired from the printing device, based on the function file stored in the information processing apparatus; and
    acquiring from the printing device, the function information concerning the function included in a request among the functions included in the device, the function corresponding to the identified one or more functions, in response to the request.

2. The method according to claim 1, wherein the method is a print control method, and wherein the configuration information is a machine type name, and wherein the print control method includes identifying the function information from among a plurality of pieces of function information each including functions that are possibly included in each machine type, based on the machine type name.

3. The method according to claim 1, wherein the method is a print control method, and wherein the function information is identification information indicating the function included in the device, and the information processing apparatus includes a determining unit configured to determine a function corresponding to the identification information, based on the function file.

4. The method according to claim 1, wherein the method is a print control method, and wherein the function information includes at least one of a finisher, a tray, and a color.

5. The method according to claim 1, wherein the method is a print control method, and wherein the function information is acquired from a machine type dedicated region in a Management Information Base (MIB) included in the printing device.

6. The method of claim 1, wherein the method is a print control method, and wherein the configuration information includes machine type identification information representing a machine type or a device ID.

7. The method of claim 1, wherein the method is a print control method, and the print control method comprises: identifying, based on the configuration information acquired from the printing device, at least one piece of function information from among a plurality of pieces of function information corresponding to a machine type, each function information corresponding to a function that printing devices of a specific machine type may have; and subsequently, identifying the function of the printing device usable from the information processing apparatus, from among the functions included in the function information of the machine type that has been identified according to the acquired configuration information, based on usage possibility information acquired based on the identified function information, wherein the acquired configuration information is acquired from the printing device.

8. The print control method of claim 7, further comprising using the setup page to request printing.

9. The method of claim 1, wherein the method is a print control method, and wherein a determination whether or not to acquire the function information is based on a comparison between a plurality of pieces of first configuration information stored in a memory and second configuration information acquired from the printing device.

10. The method of claim 1, wherein the method is a print control method, and further comprises: acquiring second configuration information from the device; identifying request information corresponding to first configuration information corresponding to the second configuration information, among a plurality of pieces of request information, from a memory configured to store the first configuration information in association with each of the plurality of pieces of request information; transmitting the identified request information to the device; and acquiring usage possibility information from the device as a response to the request information.

11. The print control method of claim 10, wherein the request information includes identification information identifying one or more functions that may possibly be used in a device that is a transmission source of the second configuration information, among functions of the transmission-source device, and the usage possibility information represents a function that can be used at the device that is the transmission source of the second configuration information, among the one or more functions included in the identification information.

12. The method according to claim 1, further comprising: displaying a setup page used for a setup corresponding to the device, according to the function information acquired from the device.

13. A non-transitory computer-readable medium storing instructions which, when executed by a computer, cause a print control method to be performed, wherein the print control method comprises:
storing a function file in an information processing apparatus, the function file describing one or more functions included in each of a plurality of devices;
acquiring, from a printing device connected to the information processing apparatus, configuration information concerning the printing device, the configuration information being stored in the printing device;
determining whether or not to acquire, from the printing device, function information corresponding to one or more functions included in the printing device, based on the configuration information acquired from the printing device;
in the case that the determination is made to acquire the function information, identifying the one or more functions for acquiring from the printing device, the one or more identified functions corresponding to the configuration information acquired from the device, based on the function file stored in the information processing apparatus; and
acquiring from the printing device the function information concerning the function included in a request among the functions included in the device, the function corresponding to the identified one or more functions, in response to the request.

14. The non-transitory computer-readable medium according to claim 13, wherein the print control method further comprises: displaying a setup page used for a setup corresponding to the device, according to the function information acquired from the device.

15. A system, comprising:
an information processing apparatus; and
a printing device which accepts a request for a process from the information processing apparatus; and
wherein the information processing apparatus is configured to store a function file in the information processing apparatus, the function file describing one or more functions included in each of a plurality of devices, acquire, from a printing device connected to the apparatus, configuration information concerning the printing device, the configuration information being stored in the printing device, determine whether or not to acquire, from the printing device, function information corresponding to one or more functions included in the printing device, based on the configuration information acquired from the printing device; in the case that the determination is made to acquire the function information, identify the one or more functions for acquiring from the printing device, the one or more identified functions corresponding to the configuration information acquired from the device, based on the function file stored in the information processing apparatus, and acquire, from the printing device, the function information concerning the function included in the request among the functions included in the device, the function file corresponding to the identified one or more functions, in response to the request.

16. The system of claim 15, wherein the information processing apparatus is configured to display a setup page used for a setup corresponding to the device, according to the function information acquired from the device.

17. An information processing apparatus comprising: one or more controllers configured to store a function file in an information processing apparatus, the function file describing one or more functions included in each of a plurality of devices, acquire, from a printing device connected to the information processing apparatus, configuration information concerning the device, the configuration information being stored in the printing device, determine whether or not to acquire, from the printing device, function information corresponding to one or more functions included in the printing device, based on the configuration information acquired from the printing device; in the case that the determination is made to acquire the function information, identify one or more functions for acquiring from the printing device, the one or more identified functions corresponding to the configuration information acquired from the printing device, based on the function file stored in the information processing apparatus, and acquire, from the printing device, the function information concerning the function included in a request among the functions included in the device, the function corresponding to the one or more functions, in response to the request.

18. The apparatus of claim 17, wherein the one or more controllers are configured to display a setup page used for a setup corresponding to the device, according to the function information acquired from the device.

* * * * *